United States Patent [19]

Kun et al.

[11] Patent Number: 5,612,728
[45] Date of Patent: Mar. 18, 1997

[54] FULL COLOR TFEL EDGE EMITTER PRINTING SYSTEM

[75] Inventors: Zoltan K. Kun, Churchill; David Leksell, Oakmont; Gerald J. Faychak, McKeesport; Juris A. Asars, Murrysville, all of Pa.

[73] Assignee: Westinghouse Electric Corporation, Pittsburgh, Pa.

[21] Appl. No.: 247,635

[22] Filed: May 20, 1994

[51] Int. Cl.$^6$ .............................. B42J 2/47; B42J 2/435
[52] U.S. Cl. ............................................ 347/232; 347/240
[58] Field of Search .......................... 347/240, 13, 232; 355/327; 345/78, 79, 209

[56] References Cited

U.S. PATENT DOCUMENTS

| | | |
|---|---|---|
| 4,074,319 | 2/1978 | Goldschmidt et al. . |
| 4,368,491 | 1/1983 | Saito . |
| 4,435,064 | 3/1984 | Tsukada et al. . |
| 4,596,995 | 6/1986 | Yamakawa et al. ............... 347/13 |
| 4,609,927 | 9/1986 | Yoshida . |
| 4,855,760 | 8/1989 | Kanayama . |
| 4,899,184 | 2/1990 | Leksell et al. . |
| 4,907,034 | 3/1990 | Doi et al. .......................... 355/327 |
| 4,947,160 | 8/1990 | Leksell et al. . |
| 5,043,715 | 8/1991 | Kun et al. . |
| 5,138,347 | 8/1992 | Kun et al. . |
| 5,200,765 | 4/1993 | Tai ................................... 347/240 |

*Primary Examiner*—Benjamin R. Fuller
*Assistant Examiner*—Thinh Nguyen

[57] ABSTRACT

A color printing system including thin film electroluminescent (TFEL) edge emitter devices and an electronic interface for driving the TFEL devices. The TFEL edge emitter devices form a multi-color TFEL edge emitter structure operable for emitting a plurality of different colors of light onto a media. The electronic interface receives gray scale data for pixels and converts it into a serial data stream used to drive pixels in the TFEL edge emitter structure. The electronic interface further includes a compensation memory for compensating for pixel variations in the TFEL structure. The compensation memory can be periodically recalibrated "in place" during the life of the printing apparatus.

32 Claims, 15 Drawing Sheets

FULL COLOR TFEL EDGE EMITTER PRINTING SYSTEM

BACKGROUND OF THE INVENTION

1. Field of the Invention

This invention relates generally to a printing system including thin film electroluminescent (TFEL) edge emitter structures for use as a high resolution light source and an electronic interface for use with the edge emitter structure of the printing system.

2. Background Information

It is known that an electroluminescent device generally, and particularly a thin film electroluminescent (TFEL) edge emitter device, may be utilized to provide an electronically controlled, high resolution light source. One thin film electroluminescent edge emitter structure has been proposed that includes a first dielectric layer disposed on a common or bottom electrode, a second dielectric layer spaced from the first dielectric layer, a phosphor layer interposed between the first and second dielectric layers and an excitation or top electrode disposed on the second dielectric layer. At least one of the electrodes, for example, the excitation or top electrode, is segmented to form a plurality of individual control electrodes in combination with the remaining structure to form a plurality of individual light emitting pixels.

It has also been proposed to use of TFEL edge emitters for electrophotographic printing. In one proposed system, input data is provided in serial form such that each line of data will activate selective consecutive pixels on a line across the TFEL a number of times per line of data. The process is then repeated many times to create a document. The application of electrical signals causes individual pixels to emit light energy at a light-emitting face. The light causes an image to be recorded on a photoreceptor upon which the emitted light strikes.

A TFEL edge emitter structure for multi-color light emission has also been proposed. This structure includes a common electrode layer, a phosphor layer, a dielectric layer, and control electrodes forming a stacked laminar arrangement and disposed on a layer of substrate material. An optical lens system receives radiated light energy from a plurality of light emitting pixels and forms a beam of light energy having a preselected, tightly controlled beam pattern. The multi-color light emission structure can be formed in a single TFEL edge emitter structure or formed as an array of separate TFEL edge emitter structures.

In applying a multi-color light emission TFEL edge emitter structure to a printing apparatus, a number of problems have arisen. For example, much greater accuracy in light levels is required in a color TFEL printing system as opposed to a black-and-white TFEL printing system in order to properly control the blending of the colors of light emitted by the edge emitter devices. In black-and-white systems, it is generally only necessary to provide enough light levels to replicate the gray scale levels that are distinguishable by the human eye. This level is approximately 64, depending somewhat on the resolution. The use of a similar number of light levels in a color TFEL edge emitter printing system, however, will cause the colors to blend in an improper manner resulting in an insufficient reproduction of the color desired to be printed. For color reproduction, three characteristics need to be controlled: hue, lightness (value), and chroma (level of color saturation). As a result, an electronic interface for receiving image data and supplying signals for driving a black-and-white TFEL edge emitter in a black-and-white printing system does not provide sufficient control for driving a multi-color TFEL edge emitter structure in a color printing system. Therefore, there is a need for a color printing system that can accurately respond to a sufficient number of light levels for each color in order to accurately reproduce shades of color on a printed document. There is also a need for an electronic interface for accepting serial image data from a computer within the printing system and driving the multi-color TFEL edge emitter structure that can provide the required light levels and accuracy for good quality color printing.

In addition, problems can occur in TFEL edge emitter devices due to the fact that all members of any large group of pixels in the prior art devices will not have identical output levels. In addition, the output level of a single pixel can change over time. Thus, the same signal applied to several pixels or applied to the same pixel at different times may result in different light outputs causing different light levels for the pixel produced therefrom. Although this non-uniformity is a problem in all TFEL edge emitter printing apparatus, it is particularly problematic in a color printing device because of the increased accuracy in light levels required for accurate reproduction of color shades. Therefore, there is also a need within a TFEL edge emitter printing system to allow the luminescence characteristics of each individual pixel or group of pixels to be adjusted both initially and later throughout the life of the system.

SUMMARY OF THE INVENTION

Accordingly, the present invention is directed to an improved thin film electroluminescent (TFEL) edge emitter printing system that substantially obviates one or more of the limitations and disadvantages of the related art.

To achieve these and other objects and advantages and in accordance with the purpose of the invention, as embodied and broadly described herein, the invention comprises a color photographic printing apparatus using thin film electroluminescent (TFEL) devices comprising means for supplying photographic media for the photographic printing apparatus, a multi-color TFEL edge emitter structure operable for emitting light of a plurality of different colors onto the photographic media supplied by the supplying means, said multi-color TFEL edge emitter structure including a plurality of light emitting pixels, an electronic interface for receiving image data and converting the image data into signals for driving the multi-color TFEL edge emitter structure, and a photodetector operable for sensing light emitted from the multi-color TFEL edge emitter structure and having an output connected to the electronic interface.

It is to be understood that both the foregoing general description and the following detailed description are exemplary and explanatory and are intended to provide further explanation of the invention as claimed.

The accompanying drawings, which are incorporated in and constitute a part of this specification, illustrate an embodiment of the invention and together with the description serve to explain the principles of the invention.

BRIEF DESCRIPTION OF THE DRAWINGS

FIG. 5 is a signal diagram showing the channel driver output voltage and common driver output voltage when a pixel is turned ON.

DESCRIPTION OF THE PREFERRED EMBODIMENTS

The preferred embodiment of the present invention is a color photographic printing apparatus using thin film electroluminescent (TFEL) devices. This apparatus includes means for supplying photographic media for the printing apparatus. The apparatus also includes a multi-color TFEL edge emitter structure operable for emitting light of a plurality of different colors onto the photographic media supplied by the supplying means. The multi-color TFEL edge emitter structure also has a plurality of light emitting pixels. The printing apparatus further includes an electronic interface for receiving image data and converting the image data into signals for driving the multi-color TFEL edge emitter structure. A photodetector is also provided which is operable for sensing light emitted from the multi-color TFEL edge emitter structure and which has an output connected to the electronic interface.

Reference will now be made in detail to the present preferred embodiments of the invention, examples of which are illustrated in the accompanying drawings.

Figure 1:
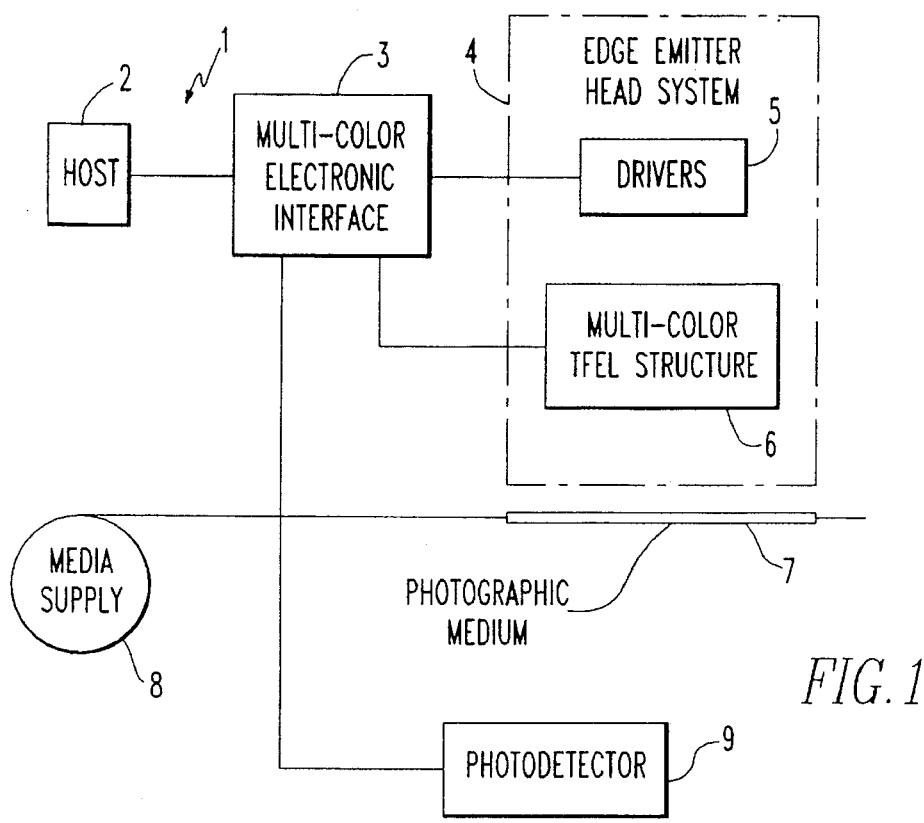
FIG. 1 is a general block diagram of the preferred embodiment of the TFEL color photographic printing apparatus of the invention.

The exemplary embodiment of the color photographic printing apparatus using TFEL devices is shown in FIG. 1 and is designated generally by reference numeral 1. Host 2 processes image data used to create a document and outputs the image data to multi-color electronic interface 3. In the preferred embodiment, host 2 may be a computer, such as a personal computer (PC), workstation, dedicated image processing system, or other similar computing device. The host may use image sources such as a CCD color camera, CD ROM device, or other data storage device. Multi-color electronic interface 3 receives the image data from the host 2, and converts it into signals that are output to an edge emitter head system 4 in order to selectively cause pixels of the multi-color TFEL structure contained within the edge emitter head system to emit light. Edge emitter head system 4 includes drivers 5 and multi-color TFEL structure 6. Drivers 5 receive signals from interface 3 and provide drive signals to an electrode layer of the multi-color TFEL structure 6 to determine which of the pixels of the multi-color TFEL structure are to be energized. Signals are also sent from interface 3 to a second electrode layer of the multi-color TFEL structure 6 in order to control the energizing of pixels in the TFEL structure.

Light emitted by pixels of the edge emitter head system 4 of the color printing apparatus impinge upon a photographic medium 7 supplied to the apparatus by media supply 8 in order to expose the photographic medium and record color images thereon. In the preferred embodiment, media supply 8 is a paper supply cassette supplying photographic paper, however, the invention is not so limited and other media supply devices may be used as well. Photodetector 9 is also provided for sensing light emitted from the multi-color TFEL edge emitter structure 6 in edge emitter head 4, and providing an indication of the received light level to the multi-color electronic interface 3 to allow the interface to compensate for variations in the luminescence characteristics of the pixels in the edge emitter structure 6. The details of this invention are described below.

Figure 2:
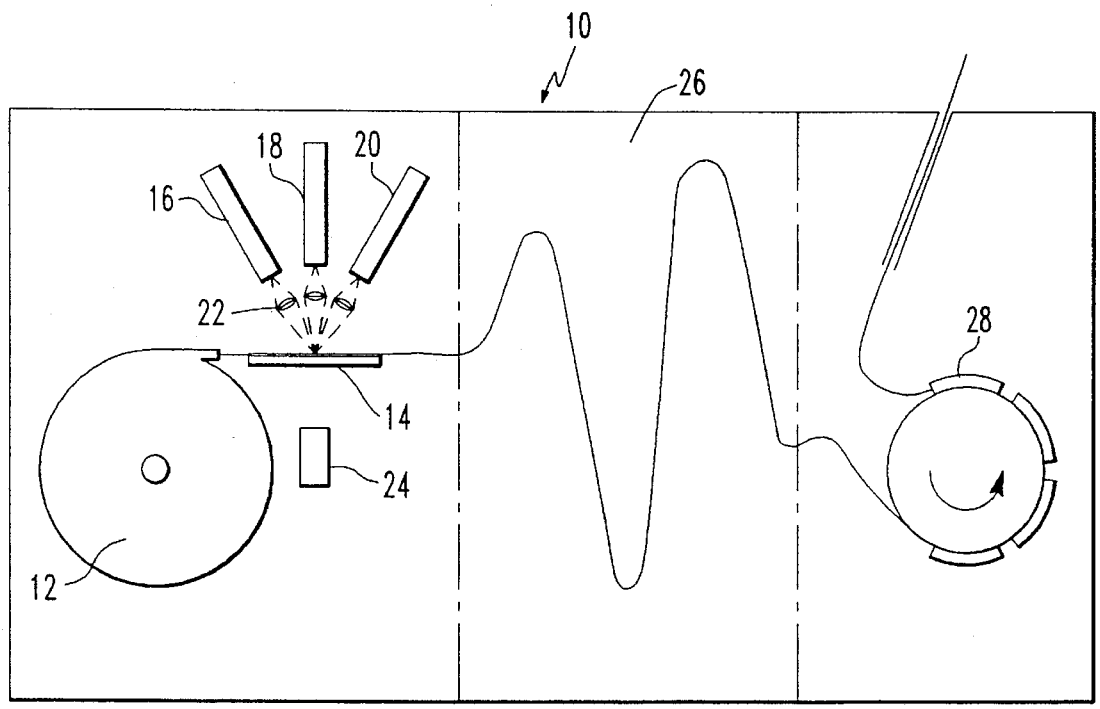
FIG. 2 is a schematic diagram of a color photographic media printer with three different color edge emitter light sources focused on the same line of the media according to a first embodiment of the invention.

FIG. 2 is a diagram of a dry silver color photographic media printer 10 with three different color edge emitter light sources focused on the same line of the media, according to a first embodiment of the invention. In the printer 10, unexposed paper exits from paper supply cassette 12 and moves across platen 14 at a constant speed. While moving across platen 14 the paper is exposed by green edge emitter head (EEH) 16, blue edge emitter head 18 and red edge emitter head 20. In the embodiment shown in FIG. 2, the green, blue and red edge emitter heads are fabricated on separate substrates, although it is also possible for more than one color edge emitter head to be fabricated on the same substrate. A series of lenses 22 are provided separate from the edge emitter heads and are used to focus the light emitted from the green, blue and red edge emitter heads on the same line of the media. A single substrate for all three color sources or two face-to-face substrates (with at least one containing two color emitters) can also be used with the present invention to provide "contact printing" with minimal spacing between the device and paper, or the use of a single graded refractive index micro lens array producing a one to one size upright image on the paper. A variety of color edge emitter structures and focusing systems are disclosed in U.S. Pat. No. 5,043,715, which is hereby incorporated by reference, and a variety of such structures can be adapted for use with the present invention. A more detailed description of the structure of a single color TFEL edge emitter is provided in U.S. Pat. No. 4,947,160, which is also hereby incorporated by reference. A photodetector 24 is also provided for sensing the light emitted from the edge emitter heads in order to compensate for variations in the luminescence characteristics of pixels in the edge emitter heads.

After exposure by the three edge emitter heads, the paper enters buffer section 26. Buffer section 26 is a light proof variable length storage compartment for exposed but undeveloped paper to accommodate speed discrepancies between exposure and development. After exiting buffer section 26, the paper is then thermally developed by a conventional dry silver paper processor 28 before exiting from the system. Although this embodiment has been described with respect to a buffer section and dry silver paper processor, these elements can be replaced by a receiving cassette (illustrated in the embodiment of FIG. 3) for paper that requires wet processing, or if the dry silver paper is processed at a different location.

Figure 3:
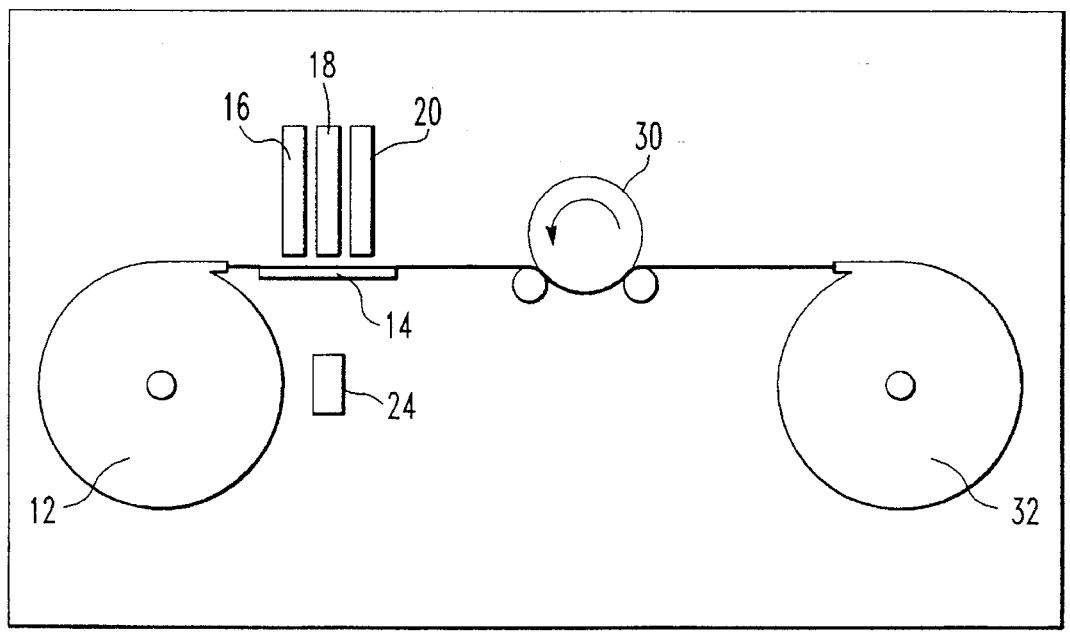
FIG. 3 is a schematic diagram of a color photographic media printer with three color edge emitters displaced from each other in the process direction according to a second embodiment of the invention.

FIG. 3 is a diagram of a color photographic media printer according to a second embodiment of the invention. In this diagram, like numerals are used to designate parts corresponding to the parts shown in FIG. 2. In FIG. 3, green edge emitter 16, blue edge emitter 18 and red edge emitter 20 are displaced from each other in the process direction to permit "contact printing," with minimal spacing between the edge emitter heads and the platen 14. Although in the illustrated embodiment of FIG. 3 the edge emitter heads are formed on separate substrates, a plurality of edge emitter heads formed on a single substrate can also be employed. Capstan 30 provides media transport and is synchronized to cause the second and third exposure to coincide with the first exposure on the media (illustrated in greater detail in FIG. 11). After exposure, the media is stored in receiving cassette 32 for development at another location.

Figure 4:
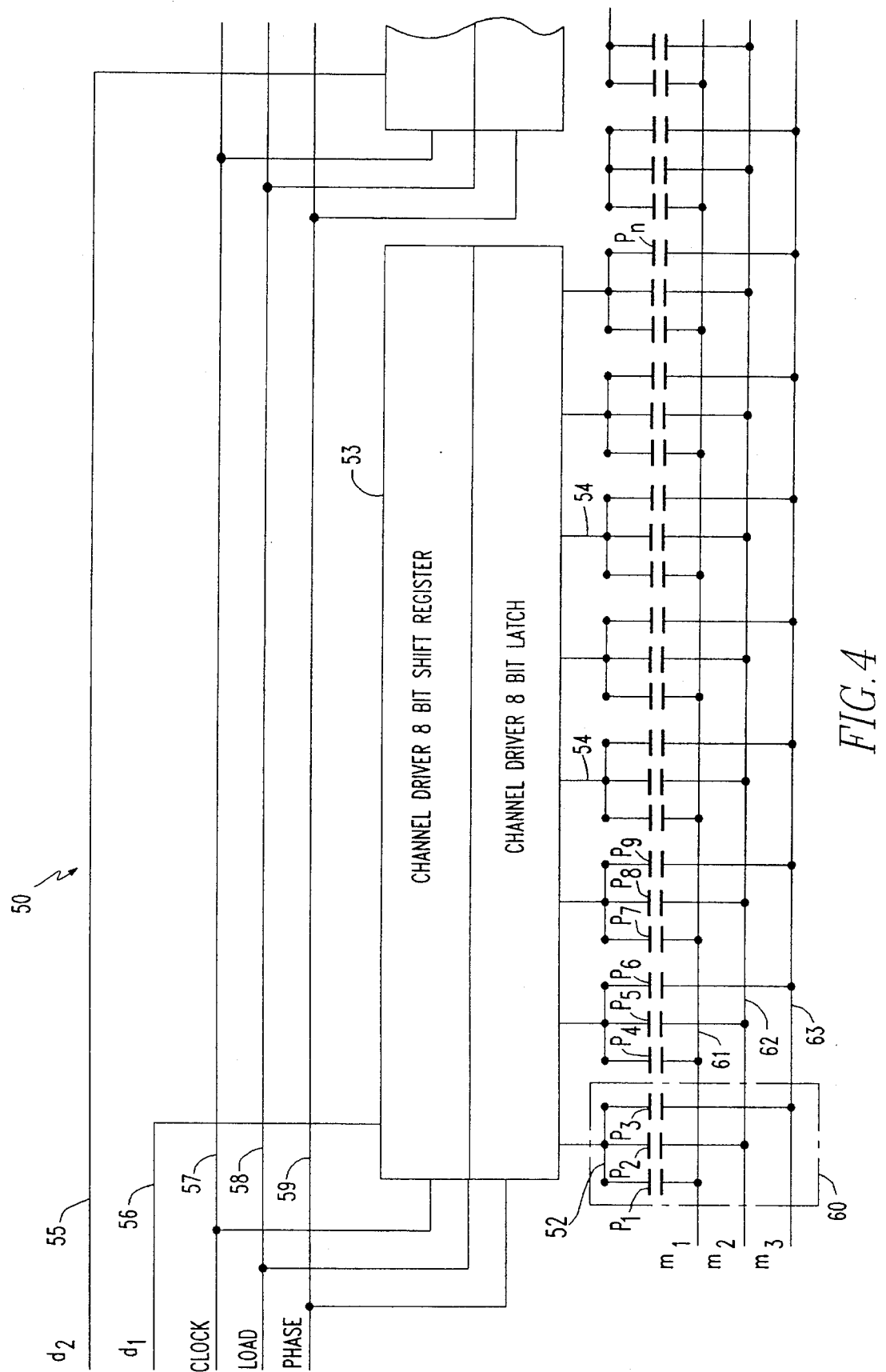
FIG. 4 is a schematic illustration of a single color TFEL edge emitter head (EEH) that can be used in the present invention.

The driving of the TFEL edge emitter head structures to create images will be described below. FIG. 4 shows an electronic drive system 50 for thin film electroluminescent edge emitters. FIGS. 4 through 10 illustrate the manner in which the structure of FIG. 4 produces an image on a photosensitive material.

As seen in FIG. 4, a first electrically conductive layer 52 of each pixel $P_1$ thru $P_n$ is connected with a first electrical source consisting of a shift register/latch/driver 53 that forms a portion of a TFEL edge emitter structure electronic drive system 50. First electrical source 53 is a commercially available combination shift register/latch/driver device having a plurality of outputs 54 connected with a plurality of TFEL pixel groups 60. In this structure each pixel group is a set of three adjacent pixels; for example pixels $P_1$, $P_2$ and $P_3$, or $P_4$, $P_5$ and $P_6$. Although these groups are generally identified by reference numeral 60, only one group $P_1$, $P_2$ and $P_3$ is enclosed by dotted lines to avoid undue clutter in the figure.

Shift register/latch/driver 53 further includes a plurality of inputs 55–59. Inputs 55 and 56 are data inputs, input 57 is a clock input, input 58 is a latch load input, and input 59 is a phase input. Data inputs 55 and 56 may be connected to an electrical signal-generating source, such as the electronic interface shown in FIG. 10. Examples of the types of electrical signal-generating sources which may provide a data input to device 53 are the internal controller of a computer or the controller of a photographic or electrophotographic-type copier or printer which converts the information to be copied or printed to a series of bits of information.

Shift register/latch/driver 53 receives a serial train of data pulses or signals in the form of bits of information from a suitable electrical signal generating source or controller on data inputs 55 and 56. The bits of information are entered into the shift register of device 53, and a single bit of information is stored at each of the shift register memory locations. For example, if shift register/latch/driver 53 is an eight output device, then a maximum of eight bits of information or first electrical signals may be stored in the eight latch locations internal to device 53. Since the construction and operation of device 53 is well known in the art, the internal operation of the device will not be described in additional detail herein. Clock input 57 receives clock pulses from the same electrical signal generating source or controller that supplies the digital bits of information to the shift register on data inputs 55 and 56 in order to allow shift register/latch/driver 53 to determine the rate at which the bits are to be received. The bits stored in the shift register of device 53 are latched into the latch portion of device 53 when a load input is received on line 58. The latch portion of device 53 is connected to outputs 54 of device 53 and maintains the bits stored at the latch locations at a constant state while additional bits of information are received by the shift register portion of device 53 on data inputs 55 and 56.

Figure 10:
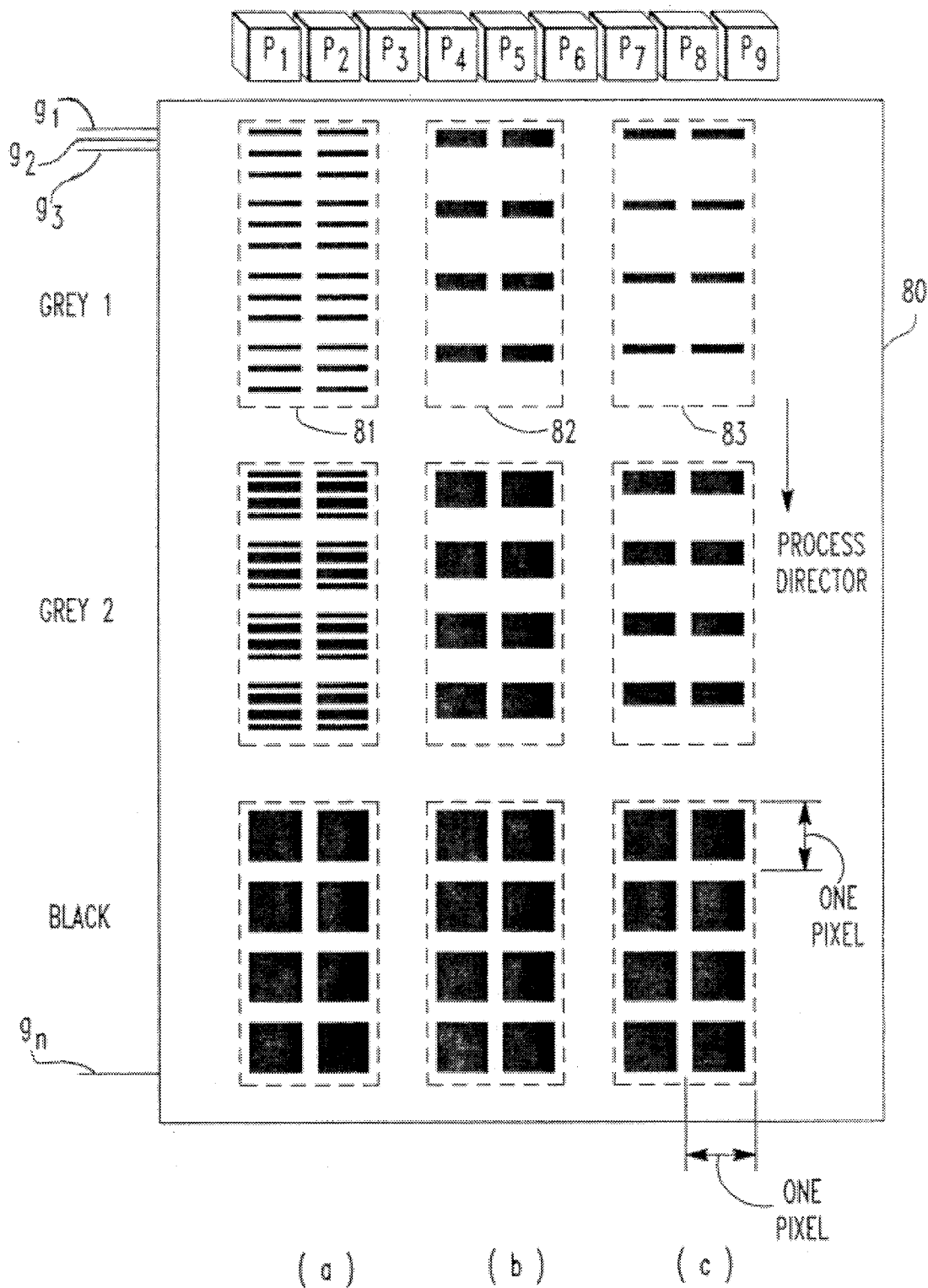
FIG. 10 is a schematic illustration of two gray scale levels and a black level produced with three groups of pixels.

As further seen in FIG. 4, electronic drive system 50 receives sequential bidirectional excitation pulses from outputs $m_1$, $m_2$ and $m_3$ of a common driver (see FIG. 10). Outputs $m_1$, $m_2$ and $m_3$ are connected to common buses 61, 62 and 63 respectively. The excitation pulses are provided to each of outputs $m_1$, $m_2$ and $m_3$ in succession, which results in excitation pulses being successively operated to each of common buses 61, 62 and 63. This succession of excitation pulses is repeated until all the data has been transferred to the electronic drive system. Phase input 59 specifies whether the data stored in the latches is for a positive or negative excitation pulse.

The operation of TFEL edge emitter assembly and electronic drive system 50 will be described below with reference to FIGS. 5–6, which illustrate signals representing the channel driver output voltage and the common driver output voltage. A series of first electrical signals in the form of bits of information is supplied to shift register/latch/driver 53 from an electrical signal generating source or controller on data input lines 55 and 56. Each of the received bits is transferred within device 53 to an individual internal latch location. The bit in a single latch location is provided as a shift register/latch/driver output signal to one of the TFEL assemblies first electrically conductive layers. Each of the electrical signals or bits supplied to outputs 54 may either be a positive value or a zero value The signal on outputs 54 is shown by reference numeral 90 in FIGS. 5 and 6, and is either a ground (zero) level or a positive level, shown as $V_L=38$ volts in the Figures.

The bits entered into shift register/latch/driver 53 on data input lines 55 and 56 during the previous operating cycle of the excitation pulse counter are supplied to the outputs 54 for one operating cycle of device 53 and maintained at the respective TFEL assembly is first electrically conductive layer 52 while the excitation pulse counter provides excitation pulses to one of its outputs $m_1$, $m_2$ or $m_3$. These excitation pulses representing the common driver output voltage are shown by reference numeral 91 in FIGS. 5 and 6. Thus, one of the common buses 61, 62 or 63 connected with the outputs $m_1$, $m_2$ and $m_3$ receives the excitation pulse. The excitation pulses 91 comprise a trilevel signal and may be, for example, either a positive value signal of +250 volts, a quiescent electrical signal of 19 volts, or a negative value signal of −212 volts. In FIGS. 5 and 6, the excitation pulses 91 have positive and negative values much greater in magnitude than the level of the channel driver output voltages. Other pulse values can be used depending on the particular application and device characteristics.

Figure 5:
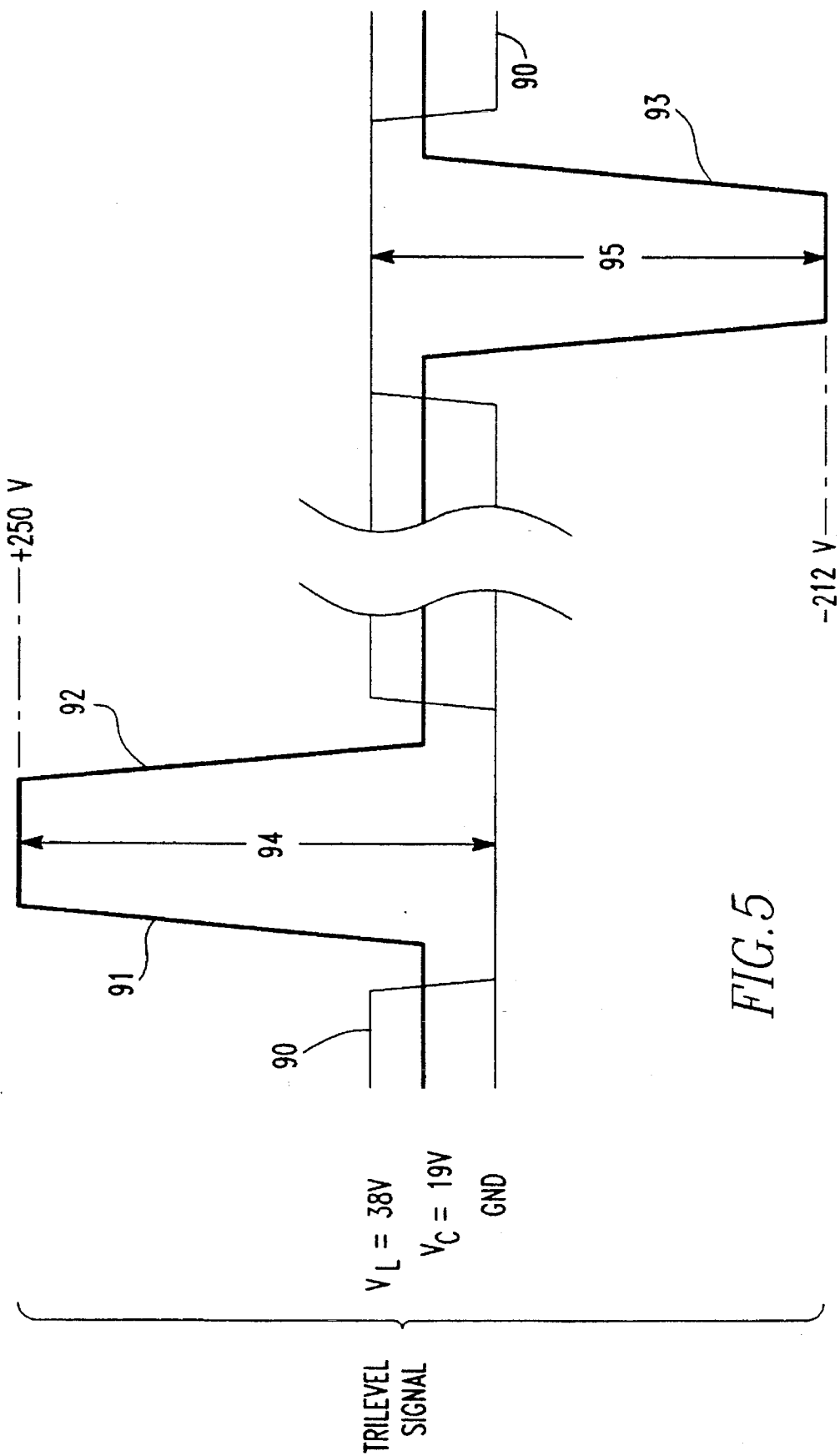
Figure 6:
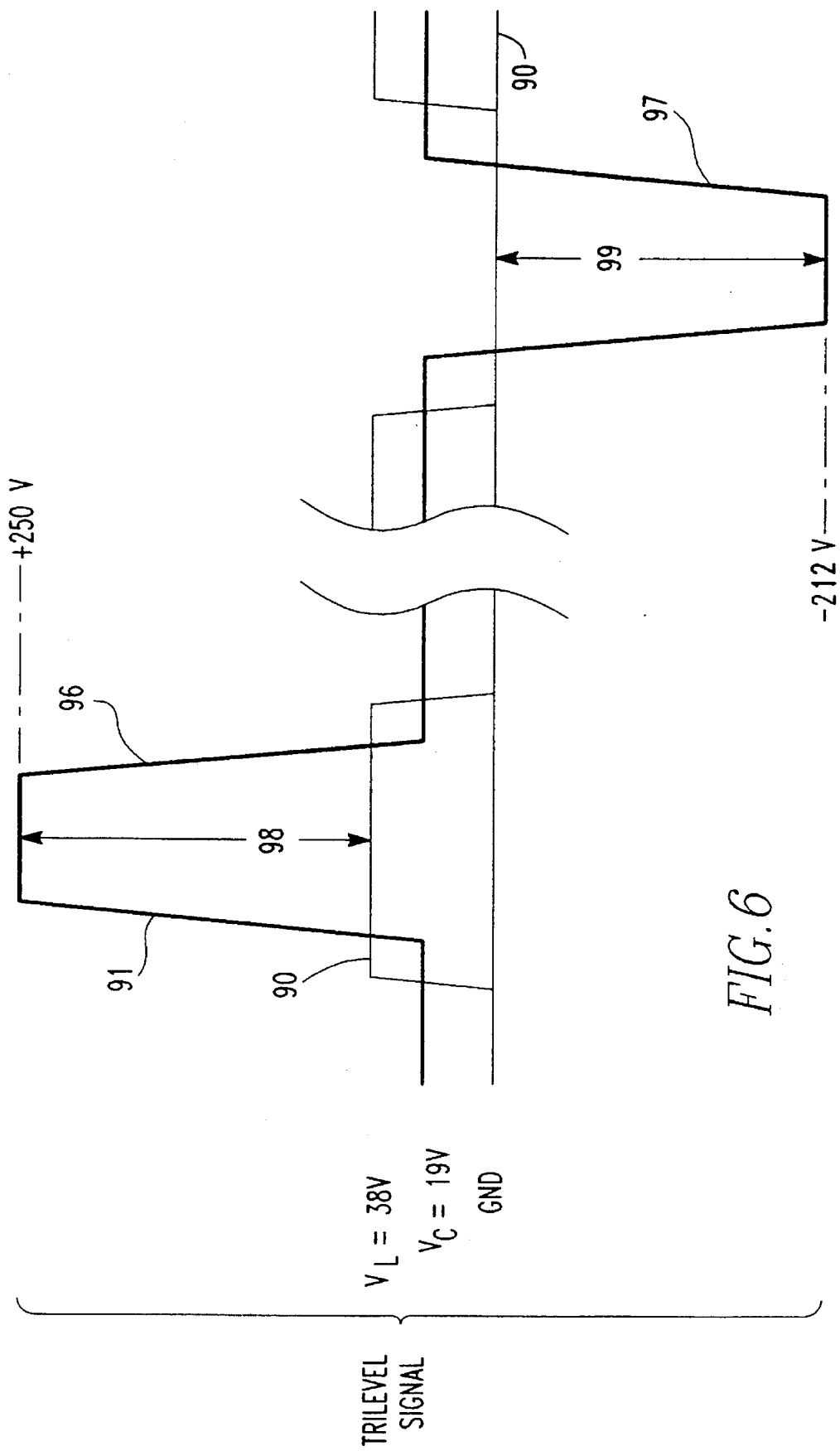
FIG. 6 is a signal diagram showing the channel driver output voltage and common driver output voltage when a pixel is turned OFF.

As illustrated in FIGS. 5 and 6, a particular pixel will emit light energy if the second electrically conductive layer of the pixel receives an excitation pulse, the first electrically conductive layer associated with the particular pixel group has an electrical signal applied thereto on line 54, and the absolute magnitude of the difference between the signals applied to the first and second electrically conductive layers exceeds a predetermined threshold. This predetermined threshold will be exceeded if the polarity of the channel driver output voltage energizing the first electrically conductive layer is the opposite of the polarity of the excitation pulse energizing the second electrically conductive layer. The predetermined threshold in this embodiment is approximately 240 volts, although it can be in the range of 180 volts to 250 volts depending on the application and device characteristics.

FIG. 5 shows a positive excitation pulse 92 and a negative excitation pulse 93 applied to a second conductive layer of a TFEL pixel. During the period that the positive excitation pulse 92 energizes the second electrically conductive layer to a level of +250 volts, the channel driver output voltage 90 energizing the first electrically conductive layer is at ground level, or zero polarity. As a result, the difference 94 between the voltages on the first and second electrically conductive layer is +250 volts. Because this voltage exceeds the predetermined threshold of +240 volts, the pixel turns on. Excitation pulse 93 applies a negative voltage level of −212 volts to the second electrically conductive layer of the TFEL pixel while the channel driver output voltage energizing the first electrically conductive layer is at a positive level of +38 volts, providing a voltage difference 95 of 250 volts. This voltage difference 95 also exceeds the predetermined threshold, causing the pixel to turn on.

FIG. 6 shows another positive excitation pulse 96 and negative excitation pulse 97 applied to a second conductive layer of a TFEL pixel. During the period that the positive excitation pulse 96 energizes the second electrically conductive layer to a level of +250 volts, the channel driver output voltage 90 energizing the first electrically conductive layer is a positive level, (38 volts in the Figure). As a result, the difference 98 between the voltages on the first and second electrically conductive layer is +212 volts, which is below the predetermined threshold, causing the pixel to be off. Also in FIG. 6, excitation pulse 97 applies a negative voltage level of −212 volts to the second electrically conductive layer of the TFEL pixel while the channel driver output voltage energizing the first electrically conductive layer is at a ground level, providing a voltage difference 99 of 212. This voltage difference 99 is also below the predetermined threshold, causing the pixel to be off.

For a single operating cycle in which the excitation pulses are successively transferred from common bus 61 through common bus 62, the excitation pulse is successively transferred from the second electrically conductive elements of a first set of similarly positioned pixels (i.e. $P_1$, $P_4$, $P_7$, etc.) of each pixel group 60 to the second electrically conductive elements of a second set of similarly prepositioned pixels (i.e. $P_2$, $P_5$, $P_8$, etc.) of each pixel group 60. Similarly, when the excitation pulses are transferred from common bus 62 through common bus 63, the excitation pulse is successively transferred from the second electrically conductive elements of the second set of similarly positioned pixels (i.e. $P_2$, $P_5$, $P_8$, etc.) of each pixel group 60 to the second electrically conductive elements of a third set of similarly prepositioned pixels (i.e. $P_3$, $P_6$, $P_9$, etc.) of each pixel group 60.

Figure 7:
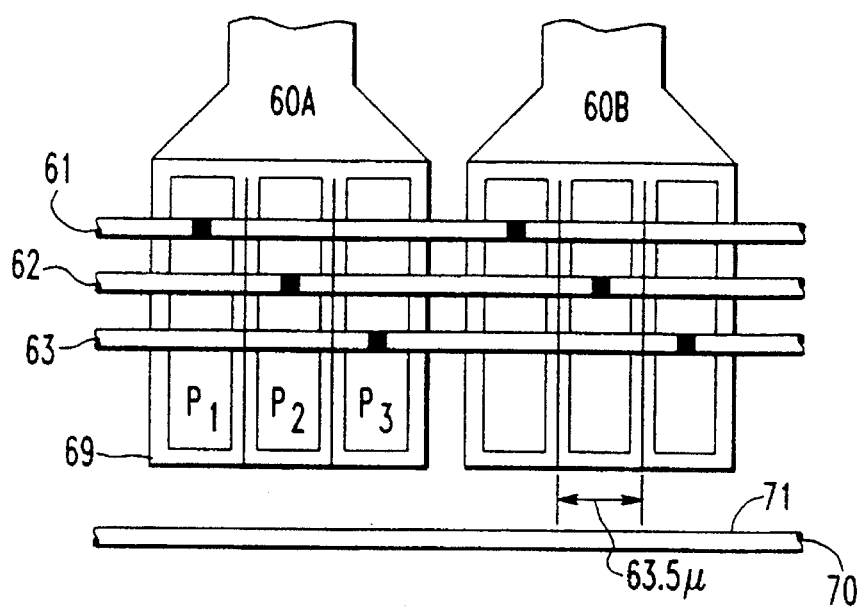
FIG. 7 is a modified plan view of a portion of the TFEL edge emitter head structure of FIG. 4 adjacent a portion of a document.

Now referring to FIG. 7, there is illustrated a pair of TFEL pixel groups 60A and 60B each containing three pixels. In the example of FIG. 7, TFEL pixel groups 60A and 60B are spaced a preselected distance from the surface of a photosensitive member 70, as in the embodiment of FIG. 3. Photosensitive member 70 may be a sheet of photosensitive material, or a photoreceptor coated on a rotating drum and utilized in conventional copying machines or printers. If, for example, it is desired to form an image of the letter "T" illustrated in FIG. 8 on the surface 71 of member 70 utilizing TFEL edge emitter structure of FIG. 4, and it is further desired that the overall width of the letter "T" is five pixels wide, then the TFEL pixel groups 60A and 60B are generally operated as follows.

As photosensitive member 70 is moved relative to TFEL pixel groups 60A and 60B, the three pixels $P_1$, $P_2$ and $P_3$ of TFEL pixel group 60A and the two pixels $P_4$ and $P_5$ of TFEL pixel group 60B are selectively energized to transmit light energy onto the surface 71 of photosensitive member 70. If each pixel has an overall width of, for example, 63.5 microns, the width of the beam of light energy projected by each pixel is 63.5 microns. If the surface 71 of photosensitive member 70 is positioned closely adjacent to the edge surfaces 69 of the pair of TFEL pixel groups, beam spread will be negligible. If the surface 71 of photosensitive member 70 is spaced from the edge surfaces 69 of the pair of TFEL pixel groups, then a focusing system may be interposed between member 70 and the pair of TFEL pixel groups 60A and 60B. As photosensitive member 70 is initially moved relative to the TFEL pixel groups 60A and 60B, the appropriate data signals and excitation pulses delivered from an electronic interface and common driver are respectively provided to the first electrically conductive layers of the pair of TFEL pixel groups and the common buses in succession. As a result, the pixels of pixel group 60A and the pixels $P_4$ and $P_5$ of pixel group 60B project light energy appropriate to form an image schematically illustrated at row 72 on the surface 71 of photosensitive member 70. As photosensitive member 70 is continuously moved relative to the TFEL pixel groups 60A and 60B, pixel $P_3$ of TFEL pixel group 60A continues to emit light energy appropriate to form an image schematically illustrated at column 73 on the surface 71. If member 70 is a photosensitive member such as a sheet of photosensitive paper, then the exposure of the sheet to the image column and row forming the letter "T" will result in a "T" being formed through development of the paper. If member 70 is a photoreceptor utilized in an electrophotographic-type imaging system, then the column and row forming the image of the letter "T" projected onto the surface of the photoreceptor will discharge the photoreceptor and allow the photoreceptor to accept a suitable toner material so that the letter "T" may thereafter be printed on a sheet of paper.

Figure 8:
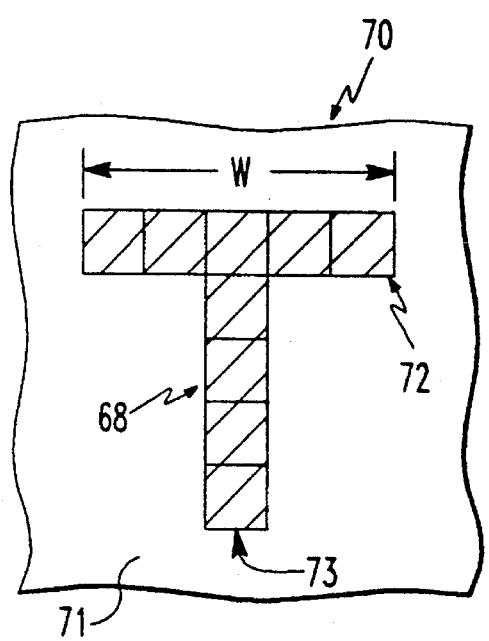
FIG. 8 is a modified schematic illustration of the letter "T" as the letter may be formed on photosensitive material using the TFEL edge emitter head of FIG. 7.
Figure 9:
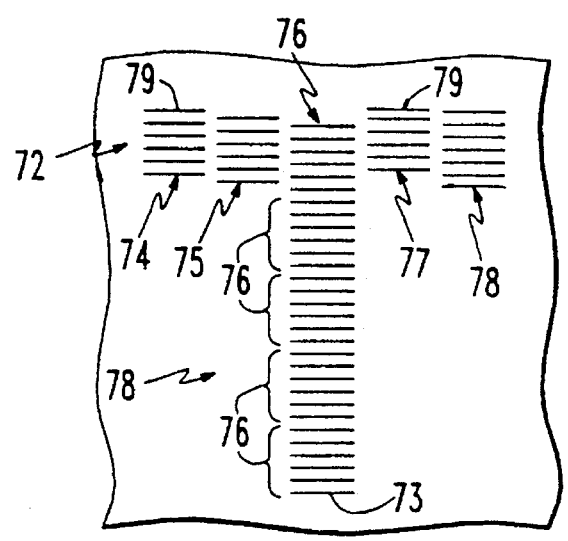
FIG. 9 is a modified illustration of the latent image formed on photosensitive material by the TFEL edge emitter structure of FIG. 7 to form letter "T" illustrated in FIG. 8.

Now referring to FIGS. 8 and 9, there is illustrated the latent image 68 formed by operation of TFEL pixel groups 60A and 60B on the surface 71 of photosensitive member 70 in order to produce the letter "T". As seen in FIG. 9, row 72 forming the horizontal bridge of the letter "T" includes five sections 74 through 78, each section being formed from, for example, five linear segments 79. The five linear segments 79 of section 74 are projected onto the surface 71 of member 70 by operation of pixel $P_1$ in TFEL pixel group 60A. Similarly, the five linear segments 79 of sections 75, 76, 77 and 78 are projected onto the surface 71 of member 70 by operation of pixels $P_2$ and $P_3$ in pixel group 60A and pixels $P_4$ and $P_5$ in pixel groups 60B. The row 72 forming the horizontal bridge of the letter "T" is actually nonlinear. This occurred because the excitation pulses are supplied in sequence to the common buses from the excitation pulse counter. As a result, all of the pixels $P_1$, $P_2$ and $P_3$ of TFEL pixel group 60A do not emit light simultaneously. However, the similarly prepositioned pixels of TFEL pixel groups 60A and 60B may emit light energy simultaneously since each of these pixels is connected with the same common bus 11 and receives the same excitation pulse. This will occur only when the first electrically conductive layers 52 of TFEL pixel groups 60A and 60B also receive an appropriate electrical signal on lines 54 at the same time that similarly prepositioned pixels receive an excitation pulse. Thus, it can be seen in FIG. 9 that the sections 74 and 77 are horizontally aligned with each other as are the sections 75 and 78 which are also distance shifted relative to the other sections. The spacing between each of the segments 79 of each of the past the TFEL assemblies as they are selectively operated to project light energy onto surface 71. As member 70 is continuously moved past the TFEL pixel groups 60A and 60B, pixel $P_3$ of TFEL assembly 60A is operated to project light energy onto surface 71 to form column 73 which forms the vertical section of the "T".

It should be understood that although each of the TFEL assemblies forming TFEL edge emitter structure 60 illustrated in FIGS. 4 and 7 includes three individual light-emitting pixels per TFEL pixel group 60, this is only an example of the number of pixels which may be formed in each TFEL pixel group. Any number of pixels may be formed in each TFEL pixel group of edge emitter structure 60 and preferably all members of the group have a common substrate. The actual number of pixels formed will be selected to achieve a desired resolution. It should be further understood that the number of individual common buses used to connect similarly prepositioned pixels of each TFEL pixel group should coincide with the number of pixels formed in each pixel group. Thus, if each TFEL assembly includes eight pixels in a group, then eight individual common buses will be used. If the number of pixels per TFEL pixel group is increased, resulting in a required increase in the number of common buses utilized, then the excitation pulse counter must be modified to include an individual output for each common bus.

For purposes of illustrating the electronic interface of the preferred embodiments of the invention, we will refer to an edge emitter drive structure having four channel driver chips with each chip having eight outputs. Each edge emitter has 96 pixels which are connected to one of the eight driver chip outputs and one of the three multiplexing ratio or excitation pulse inputs. One complete channel driver and associated pixels are illustrated in FIG. 4. The broken away shift register/latch/driver 53A indicates the presence of additional shift register/latch/driver devices and associated pixels. In the systems which utilize the edge emitter drive structure of FIG. 4, a buffer memory (not shown in FIG. 4) is provided between the data input source and the channel drivers. The buffer memory receives data serially from a data source such as a personal computer or telephone line. Each line of print has a width corresponding to a line of n pixels. Data for the first line of print is delivered sequentially from the buffer memory to the pixels to be activated in the line of n pixels. Then the system repeats the process for subsequent lines of print. The number of excitation pulses per line will determine the gray scale which can be created by the system.

The concept of gray scale is illustrated in FIG. 10. Assume it is desired to create three sets of adjacent rectangular boxes 81(a)–(c), 82(a)–(c) and 83(a)–(c) across photosensitive paper 80. Each box has a width corresponding to two pixels and the boxes are separated by the width of one pixel. To create the boxes we will use pixels $P_1$ and $P_2$ for boxes 81(a)–(c), pixels $P_4$ and $P_5$ for boxes 82(a)–(c) and pixels $P_7$ and $P_8$ for boxes 83(a)–(c). Pixels $P_3$ and $P_6$ will not be activated thereby providing white space between the boxes. Assume that the boxes are to be printed on a page 80 of photosensitive paper which passes under the pixels $P_1$ thru $P_9$. The paper 80 can be considered to have a series lines $g_1$ thru $g_n$ such that activation of a pixel over the line will cause a black segment to appear on the paper. Pixels $P_1$, $P_2$, $P_4$, $P_5$, $P_7$ and $P_8$ are activated when line $g_1$ is under the pixels. When line $g_2$ is under the pixels, $P_4$, $P_5$, $P_7$ and $P_8$ are activated. When line $g_3$ is under the pixels, $P_4$ and $P_5$ are activated. This produces the different segments in the top of boxes 81(a), 82(a) and 83(a). As can be seen in FIG. 10, blocks having various gray levels can be produced by selectively activating pixels as each line of paper passes the edge emitter containing the pixels. The black boxes at the bottom of page 80 are obtained by simultaneously activating $P_1$, $P_2$, $P_4$, $P_5$, $P_7$ and $P_8$.

Figure 11:
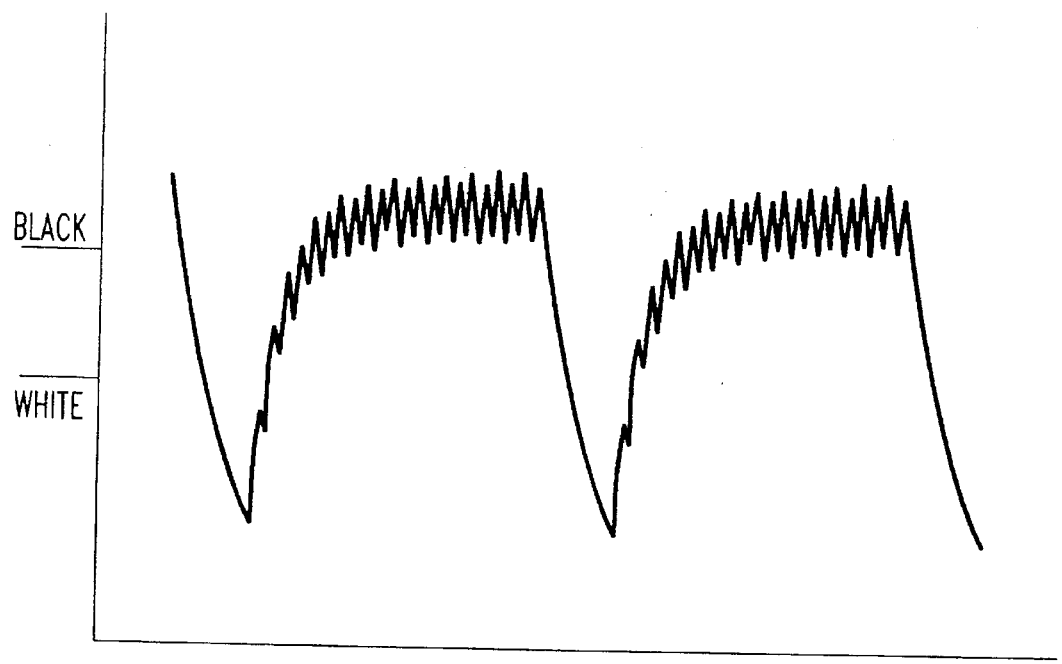
FIG. 11 is a graph showing the light output of a pixel by applying electrical pulses using the "missing pulse drive."

The gray level of any pixel of print is related to the light output of the light emitting pixel which creates the pixel of print. Light output is generated by applying electrical pulses to the light emitting pixel. Application of an electrical pulse generates a peak light output which decays until the next pulse is applied. Only a certain number of excitation pulses can be applied per pixel of print, depending on excitation frequency and printing speed. In FIG. 10, there are two levels of gray, printed by $P_1$ and $P_2$ in boxes 81(a) and 81(b). The electrical pulses to produce Gray Level 1 are relatively few, and are separated by large time intervals. Gray Level 2 is produced by a greater number of pulses, separated by smaller intervals. Black, shown in box 81(c), is produced by the maximum number of pulses per pixel, which in the example shown in FIG. 9 is eleven (fourteen, pulses minus three missing pulses). In Gray Level 1 and Gray Level 2, the dark and light areas are not resolved by the human eye. Rather, they give the viewer the impression of lighter gray when the black areas are relatively small in relation to the light areas, and give the impression of darker gray when the black areas are larger in relation to the light areas. In order to provide a more rapid light output decay time for the TFEL edge emitters without increasing the voltage and cost of the channel drivers, the preferred embodiment of the invention utilizes a "missing pulse drive" that removes some of the excitation pulses at the beginning of each pixel period. FIG. 11 illustrates the use of the missing pulse drive for a pixel period having 14 (P) pulse subintervals. The optimum number of subintervals per pixel is dependent on the printing speed: slower speed allows more subintervals and correspondingly higher levels of gray scale. In FIG. 11, the horizontal direction represents the time dimension and the vertical direction represents the relative power of light incident on the photoreceptive media. In FIG. 11, each pixel time period is divided into 14 (P) subintervals with missing excitation pulses during three ($P_o$) of these subintervals. The 11 ON pulses following the three missing pulses cause a black pixel level to be produced. The ON-OFF sequence of the 11 ($P-P_o$) pulses following the missing pulses can be varied to produce a wide variety of gray levels. The use of the three missing pulses before the remaining pulses provides a more rapid light output decay time for the pixel, and thus improves the spacial resolution, without increasing the voltage and cost of the control signal sources (channel drivers).

Various gray levels for each pixel can be created using different sequences of ON-OFF pulses during the pixel period. In order to provide a sufficient number of gray scale levels for each TFEL edge emitter device to ensure proper blending of colors in a color photographic printing apparatus, the "venetian blind" approach can be used. The venetian blind approach interlaces the ON and OFF subintervals in each pixel, and allows the time difference between each excitation pulse as well as the duration of each excitation pulse to be varied.

Figure 12:
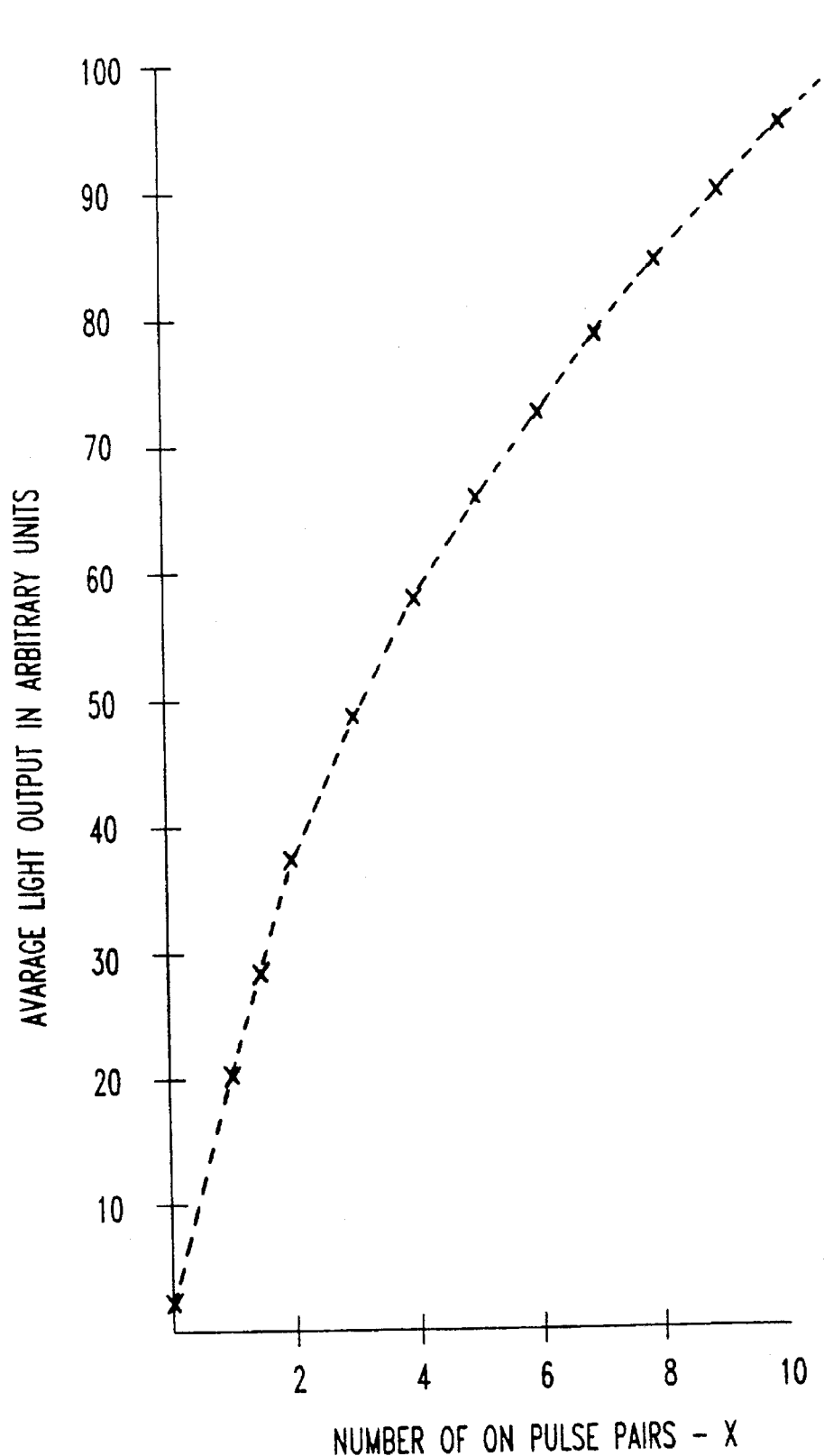
FIG. 12 is a graph showing the number of different light levels that can be obtained using the venetian blind gray scale approach with a 14 pulse pair pixel period.
Figure 13:
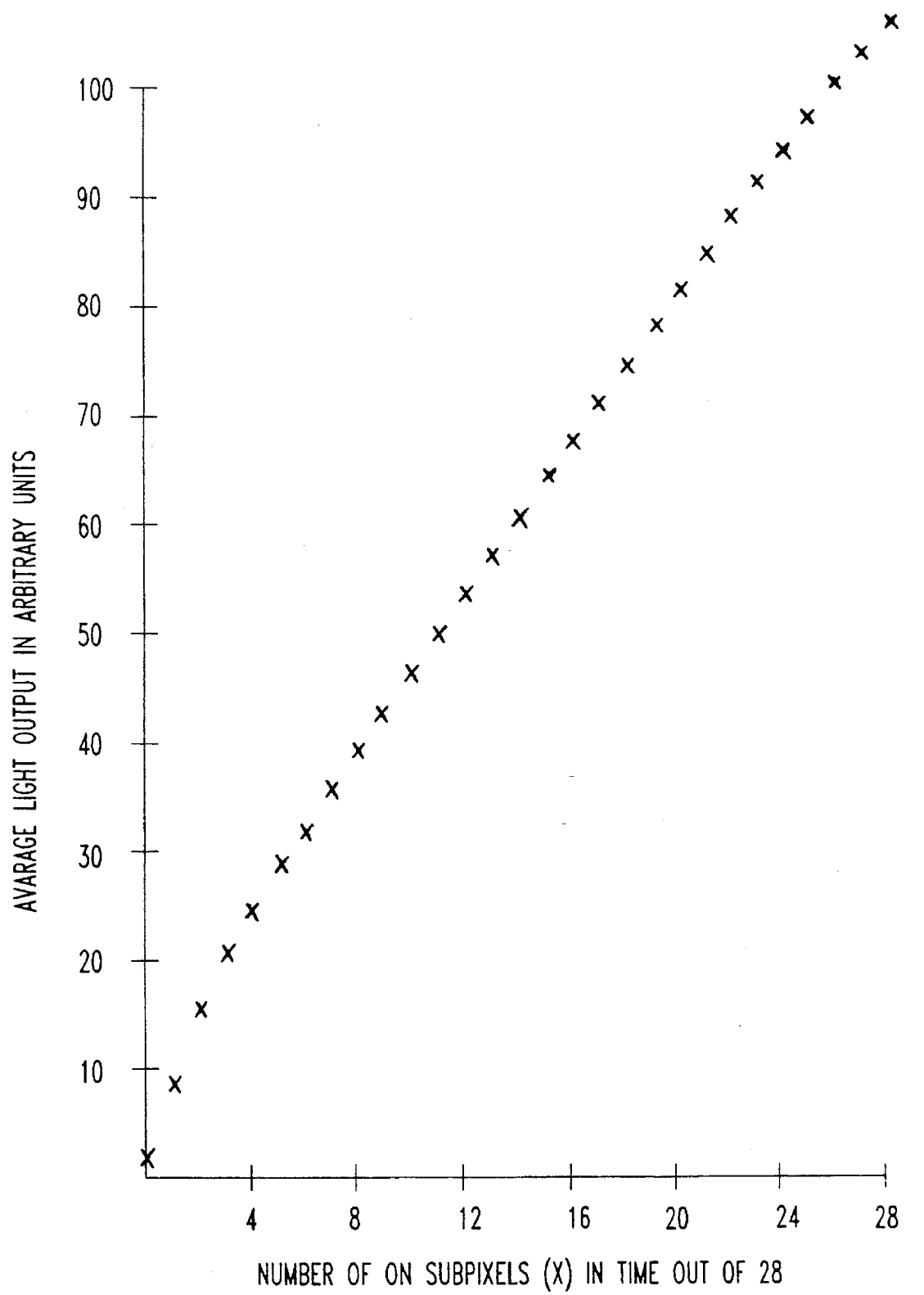
FIG. 13 is a graph showing the number of different light levels that can be obtained using the venetian blind gray scale approach with a 32 pulse pair pixel period.

The "venetian blind" approach is illustrated in FIGS. 12 and 13. FIG. 12 illustrates a 2.16 ms pixel period containing 14 pulse pair intervals with three missing pulses. A 270 volt ON voltage and 32 volt control voltage was used in the example illustrated in FIG. 12. In FIG. 12, there are eleven subintervals in each pixel which are used to create gray scale (14 subintervals minus 3 missing pulses). Thus, eleven different light levels are obtained when the "ON" pulse pairs are provided in succession. The venetian blind approach increases the number of gray levels by varying the sequence and duration of the ON-OFF subintervals. As shown in FIG. 12, as the number of ON subintervals increases, the number of light output levels obtainable by rearrangement of ON pulse pair subintervals also increases, increasing the total number of gray scale levels available. For continuous tone gray scale photographic printing, more gray scale levels can be provided by increasing the number of subintervals per pixel. FIG. 13 illustrates the greater number of gray scales obtained using an 11.52 ms pixel period having 32 subintervals and 4 missing pulses, resulting in 28 subintervals used to provide gray scale. A 280 volt ON voltage and 40 volt control voltage was used in the example illustrated in FIG. 13. As shown in FIG. 13, The venetian blind approach greatly increases the number of gray levels by varying the sequence and duration of the ON-OFF subintervals. The number of output levels can be increased further depending on the required printing speed. The slower the acceptable printing speed, the higher the number of subintervals which can be accommodated within a pixel, leading to more levels of gray. For simplicity, the examples of FIGS. 12 and 13 have been described for black and white photographic printing. In the case of color photographic printing, red, green, and blue edge emitter arrays can be individually driven by pulses applied in the subintervals of a pixel, producing many levels of chroma prior to full color saturation.

Figure 14:
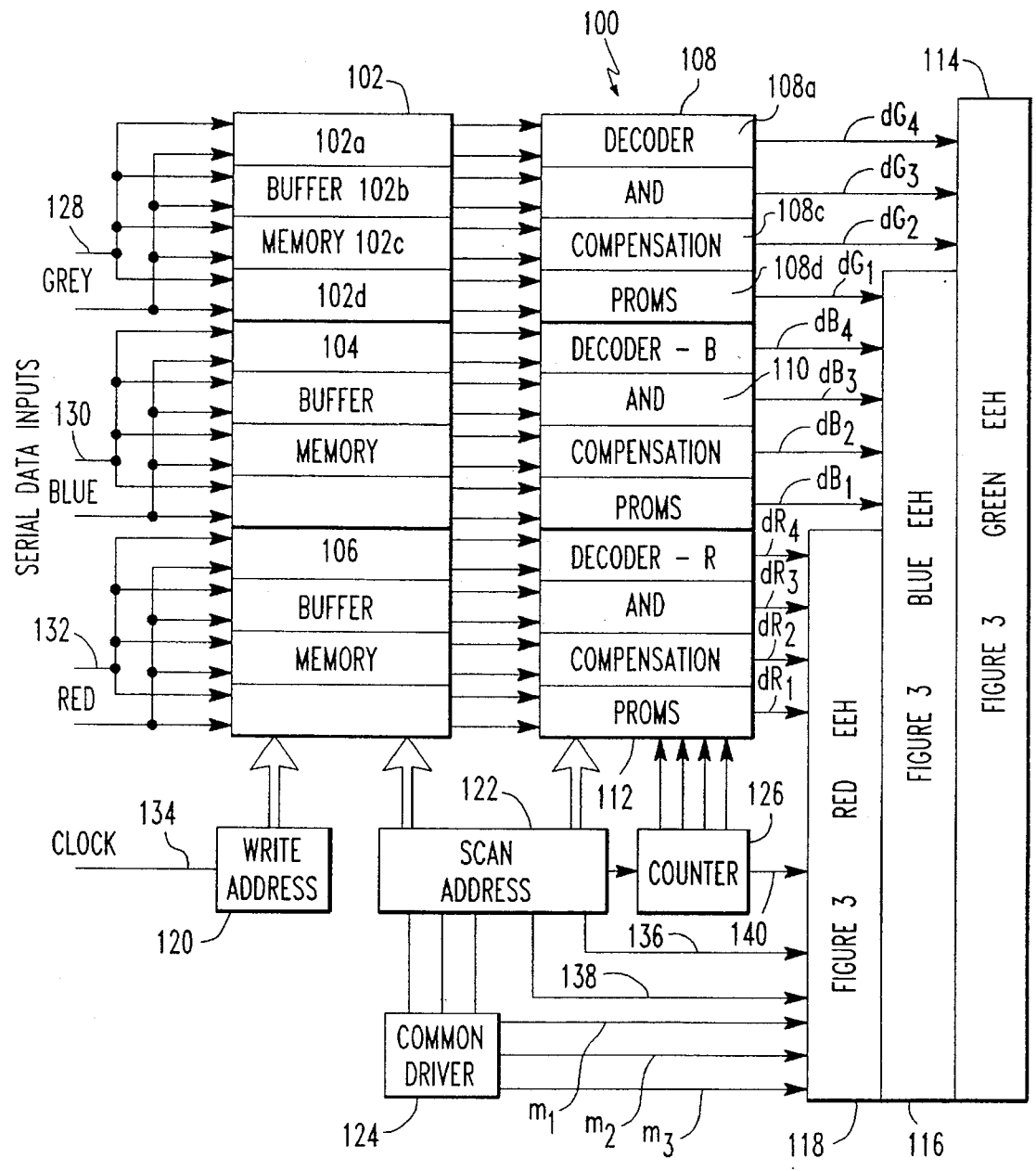
FIG. 14 is a block diagram of an electronic interface that accepts serial data and drives the three primary color edge emitters focused on the same line of the media in the process direction according to the first embodiment of the invention illustrated in FIG. 2.

FIG. 14 is a block diagram of an electronic interface 100 that accepts serial (with respect to pixels) data and drives the three primary color edge emitters focused on the same line of the media in the process direction as shown in the first embodiment of FIG. 2. Data is input into the system on lines 128, 130 and 132, for the green, blue and red EEHs, respectively. The interface 100 includes three buffer memories 102, 104, and 106, one for each of the green, blue and red edge emitter heads, which receive the data sent on lines 128, 130 and 132. Each buffer memory includes four individual memories, shown as RAMs 102a–102d in buffer memory 102. Interface 100 also includes three decoder and compensation PROMs 108, 110, and 112, connected to the outputs of the buffer memories. Serial data output from the decoder and compensation PROMs is fed to green EEH 114, blue EEH 116, and red EEH 118 which control the light emitted by the TFEL edge emitters. Write address generator 120 controls the writing of serial data into the buffer memories, and scan address generator 122 controls the reading of data out of the buffer memories and the generating of address inputs for the decoder and compensation PROMs. Common driver 124 provides electrical signals sequentially to each of its outputs $m_1$, $m_2$ and $m_3$, which in turn sequentially energize common buses 61, 62, and 63 (see FIGS. 3 and 4). Excitation pulse counter 126 identifies the excitation pulse within a pixel in the process direction.

In order to explain the operation of electronic interface 100, the operation of the circuitry for controlling the green EEH 114 will be described. The circuitry for controlling each EEH is substantially the same, and buffer memories 102, 104 and 106, decoder and compensation PROMs 108, 110 and 112, as well as EEHs 114, 116, and 118 are operated in parallel. Thus, an understanding of the operation of the system can be obtained from a description of the operation of the interface circuitry for EEH 114.

In operation, serial data is delivered from a host computer to buffer memory 102 through lines 128, with gray scale defined by more than one serial data bit per pixel. For simplicity, this system illustrates only a two bit gray scale. In the interface 100, each of buffer memories 102, 104, and 106 has four individual RAMs, each of which contains the data to be directed to one quarter of the edge emitter array for its respective edge emitter head. For example, the buffer memory 102 for green EEH 114 is divided into individual RAMs 102a, 102b, 102c and 102d. The data for pixels is delivered serially by the host to the individual RAMs 102a–102d with each gray scale bit at a separate input.

Once all data for a complete pixel line is stored in RAMs 102a–102d, it is transferred through the decoder and compensation PROMs 108a–108d to edge emitter head 114, which is shown in detail in FIG. 4. The data from RAMs 102a–102d is read out simultaneously, and each of RAMs 102a–102d outputs gray scale data on two lines to a corresponding decoder and compensation PROM 108a–108d. Each decoder and compensation PROM 108a–108d decodes the two data streams from one of RAMs 102a–102d into a single serial data stream, which is output on one of lines $dG_1$–$dG_4$. In each decoder and compensation PROM 108a–108d, a compensator PROM rescales the gray scale data from the buffer RAM to a decoder programmable logic device (PLD) to compensate for differences in brightness between pixels of the edge emitter array. This compensator lowers the output value if the actual edge emitter light output is greater than the norm, and increases the output value if the edge emitter light output is less than the norm.

The decoded data streams from decoder and compensation PROM 108a–108d are then fed as data inputs to the green edge emitter head 114 on data ports $dG_1$–$dG_4$. Data for pixels $P_1$, $P_4$, $P_7$, $P_{10}$ and other similarly spaced pixels in the first quarter of the array shown in FIG. 4 are sequentially applied to channel driver input $dG_1$. Data for pixels $P_{25}$, $P_{28}$, $P_{31}$ and other similarly spaced pixels in the second quarter of the array are input through data port $dG_2$. Data is input through data input $dG_3$ for the pixels in the third quarter of the pixel arrays. Data for the fourth quarter pixel arrays is input through input $dG_4$.

After completion of this data transfer to the edge emitter head 114, the data in the channel driver shift registers 53 (see FIG. 4) are loaded in the channel driver latches. The first excitation pulse from common driver 124 is applied to input $m_1$ while data for pixels $P_2$, $P_5$, $P_8$ and $P_{11}$ and similarly positioned pixels in the first quarter of the array are applied to channel driver input $dG_1$, data for pixels $P_{26}$, $P_{29}$, $P_{32}$ and other similarly positioned pixels in the second quarter of the array is applied through input $dG_2$ and so forth. As the input serial data on line 128 is fed to buffer memories 102–106 on lines 128, a clock input 134 is provided that enables the system to track and provide addresses for the data entering buffer memories 102–106 using write address generator 120. When the data is taken from the buffer memory 102, the addresses are scanned by scan address generator 122. Scan address generator 122 also provides input clock 136 and latch load pulse 138 to the EEHs 114–118 as well as logic signals for the common driver 124. Commercially available chips can be used, such as a 74HC74 D-latch combination for the decoder portions of decoder and compensation PROMs 108–112 and 74HC161 presettable counters for the scan address generator 122.

In the electronic interface 100 of FIG. 14, The minimum write clock frequency for the buffer RAMs 102a–102d n/t words per second, where n is the number of pixels in the edge emitter array, and t is the pixel time interval. For example, in an edge emitter head having 96 pixels as shown in FIG. 4, the minimum write clock frequency is 96/t. Data for a pixel line is read simultaneously from all buffer memory sections as many times as the maximum number of pulses per pixel time interval, which is $2(P-P_o)$ where P is the number of pulse air intervals per pixel and $P_0$ is the number of missing pulse pairs. This data is read at a minimum frequency of 2nP/Dt words per second, where D is the number of individual buffer memory sections for each of buffer RAMs 102, 104 and 106. A corresponding decoder and compensation PROM for each of the individual buffer RAM sections transforms each of the RAM outputs into $2(P-P_o)$ data streams with n/D bits each.

The minimum size of each of the individual buffer RAM sections (i.e. 102a–102d) is 2n/D words by S bits. S is the number of gray scale bits stored in the buffer memory to define the gray scale. In the illustration having 96 pixels, 4 individual buffer RAM sections per buffer RAM, and 2 gray scale bits, the size of RAMs 102a–102d is 48 words by 2 bits each. The minimum size of each of the decoder and compensation PROMs 108a–108d for each of the individual buffer RAM sections 102a–102d is $2^S n(P-P_o)/D$ words by one bit. As an alternative, the introduction of K-input multiplexers between the PROM outputs and respective channel drivers can change the PROM organization into a more available $2^S n(P-P_o)/KD$ word by K bit layout.

The circuit illustrated in FIG. 14 includes some compensation capability for initial nonuniformity in the gray scale exposure of the photoreceptive media or the photographic emulsion using compensation PROMs in devices 108a–108d. If the light energy emitted from particular TFEL pixels to the photoreceptive media is higher than the norm, the number of ON excitation pulses for those pixels can be reduced by proper entries in the corresponding PROM or PROMs. The result of such a reduction of ON excitation pulses is illustrated in FIG. 10, which shows the pixels of print being shorter in the process direction in the right hand column of FIG. 10 as compared to the center column. The degree of compensation for each edge emitter assembly with its optics, may be determined during its final manufacturing test and then entered into the PROMs that remain with each EEH unit. This will produce coarse compensation for gradual variations in light output levels by dividing the edge emitter pixels in D continuous groups (4 in the illustration) and adjust the levels on a group by group basis.

The circuit of FIG. 14 is capable of compensating for light level variations on a pixel by pixel basis. Individual pixel nonuniformity compensation requires D=P/nM PROMs (4 in illustration) with a minimum of 2 nMS words by 1 bit in the illustration. The address inputs for each of the PROMs are determined by the combination of the gray scale bits from the corresponding RAMs 102a through 102d and the common bits from the scan address generator 122 as well as the counter 126 that identifies the excitation pulse within a pixel in the process direction. The size of these PROMs can be reduced if identical light level corrections for every gray scale level are performed to pixels in groups rather than on an individual pixel basis.

Figure 15:
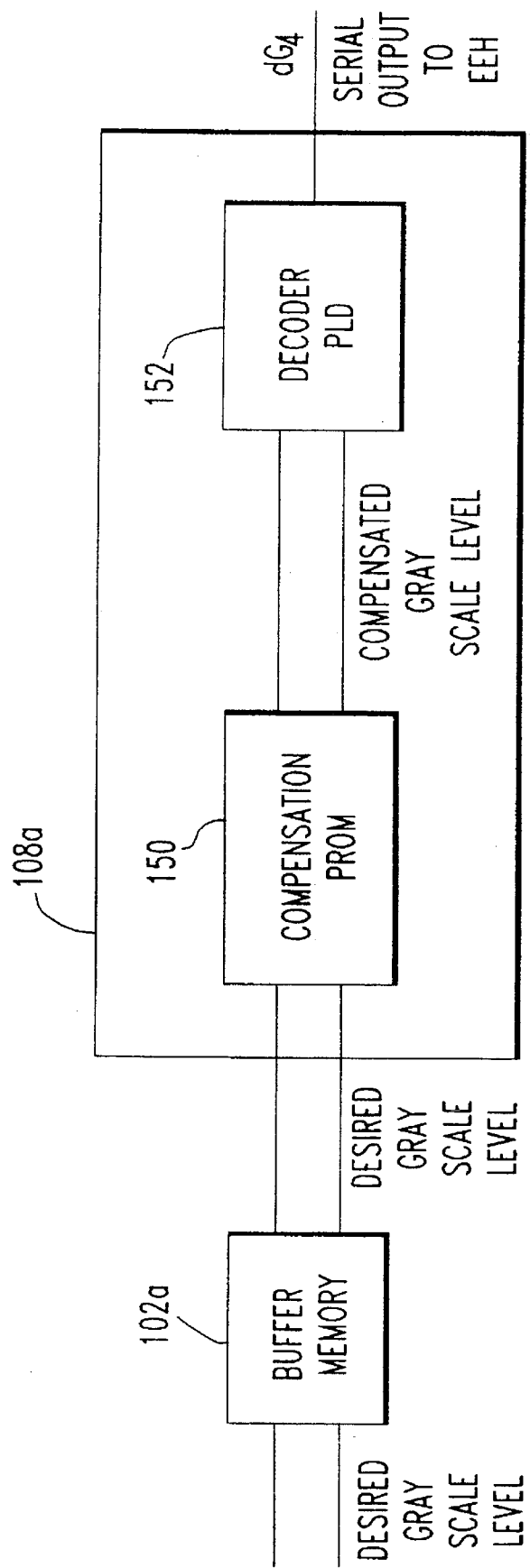
FIG. 15 is a more detailed block diagram of a decoder and compensation PROM used in the electronic interface of FIG. 14.

FIG. 15 illustrates one embodiment of decoder and compensation PROM 108a. Each of decoder and compensation PROMs 108–112 includes four sections, each having the construction shown in FIG. 15. In FIG. 15, decoder and compensation PROM 108a includes a compensation PROM 150 and a decoder 152, which is shown in FIG. 15 as a programmable logic device (PLD). Compensation PROM 150 receives the desired gray scale level from buffer RAMs 102a. Compensation PROM 150 adjusts the desired gray scale level according to a stored compensation value, to output a compensated gray scale level. Compensation PROM 150 can be implemented by a lookup table which outputs a compensated level stored at a predetermined location when a particular desired gray scale level is received at the input. Decoder 152 transforms the compensated gray scale level from compensation PROM 150 into serial data, which can be used to drive an edge emitter head. This serial data is output on line $dG_4$ to Green EEH 114.

Figure 16:
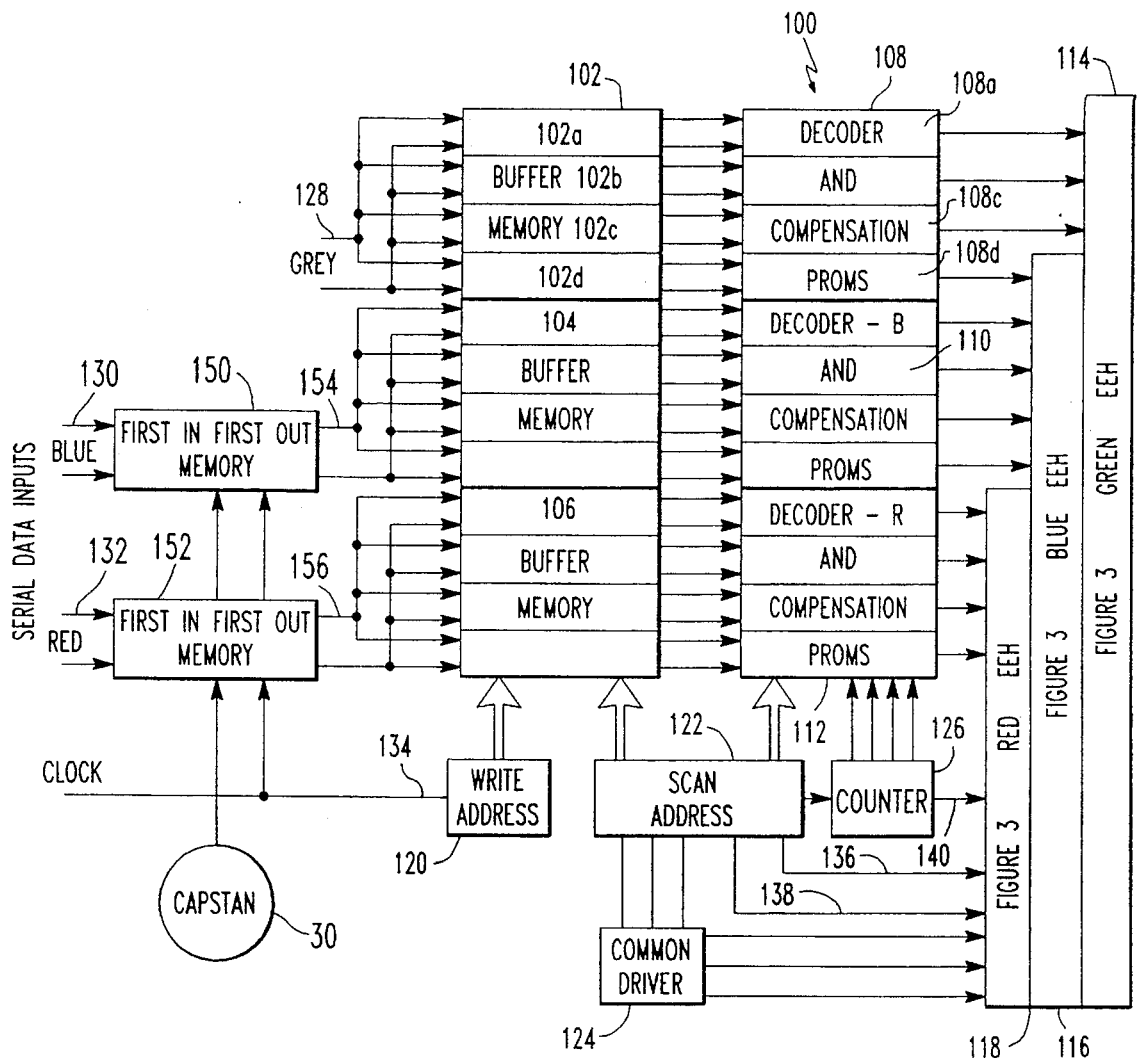
FIG. 16 is a block diagram of an electronic interface for a system that provides sequential exposure of the three colors according to the second embodiment of the invention illustrated in FIG. 3.

FIG. 16 is a block diagram of an electronic interface similar to that illustrated in FIG. 14 for the second embodiment illustrated in FIG. 3 using sequential exposure of the three colors. In FIG. 16, parts that are similar to those in FIG. 14 are illustrated using like reference numerals. Two first in first out (FIFO) memories 150 and 152, with clocks synchronized to data input clock 134 and media transport capstan 30, provide the required data delays for the second and third color exposure to coincide with the first one on the photographic media. FIFO memory 150 receives serial data for blue EEH 116 on lines 130 and, after providing the necessary delay to cause the serial data to coincide with the serial data on lines 128 for green EEH 114, sends the data to buffer memory 104 on lines 154. FIFO memory 152 receives serial data for red EEH 118 on lines 132 and, after providing the necessary delay to cause the serial data to coincide with the serial data on lines 128, sends the data to buffer memory 106 on lines 156.

As the light emitter arrays are fabricated and then operated under diverse conditions, their pixel to pixel variation in brightness can be unacceptable not only initially but also later during otherwise useful life. While a linear TFEL edge emitter array is used to illustrate the following periodic "in place" recalibration method and apparatus, "in place" recalibration can be adopted for linear or planar electroluminescent, LED, or other discrete light emitter arrays.

Figure 17:
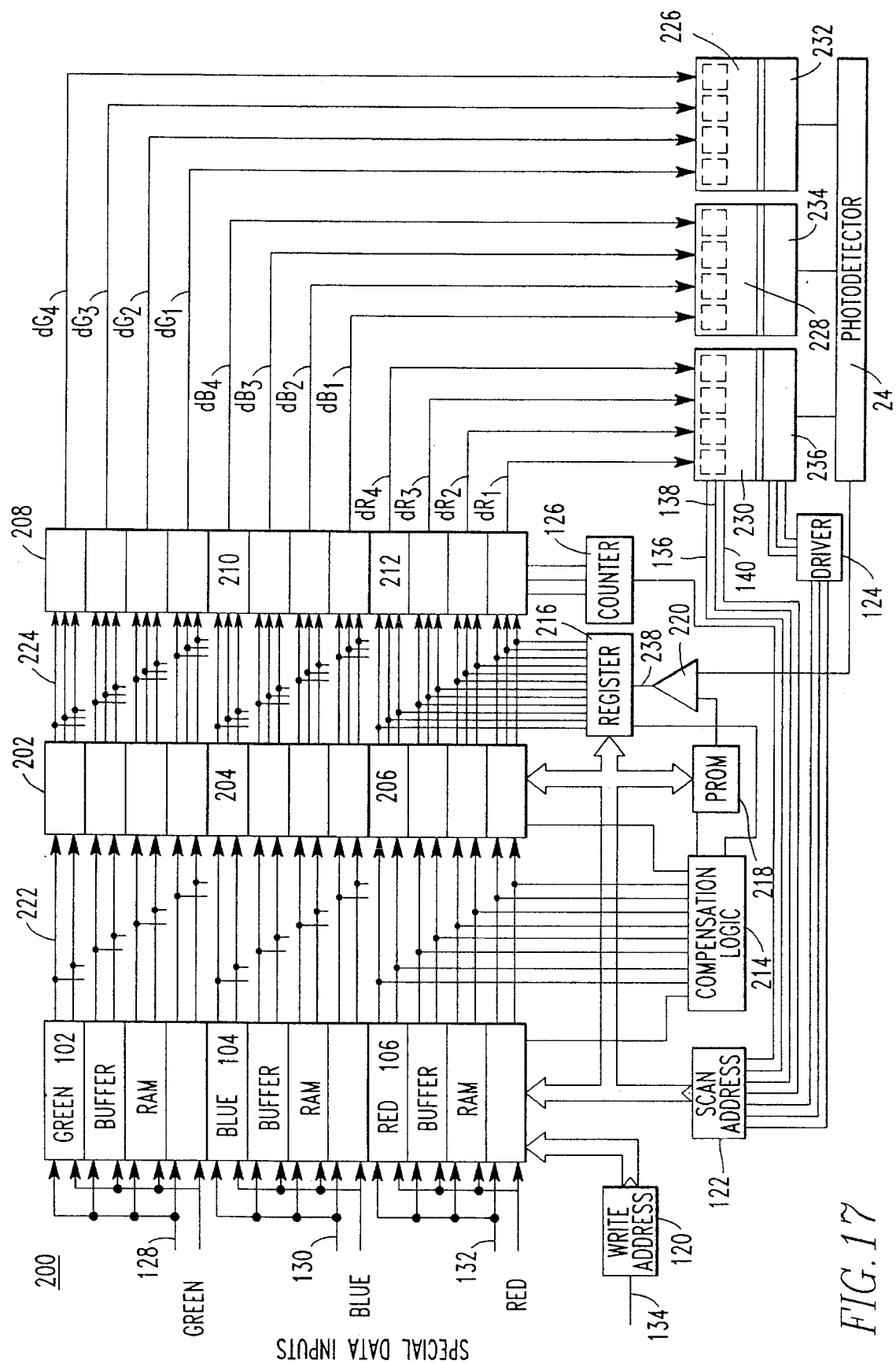
FIG. 17 is a block diagram for a full color edge emitter electronic interface with periodic "in place" recalibration.

FIG. 17 is a block diagram of a full color edge emitter printer electronic interface 200 with periodic "in place" recalibration. The interface 200 includes green, blue and red buffer RAMs 102, 104 and 106 that receive serial data on inputs 128, 130 and 132, respectively. The interface also includes compensated gray scale RAMs 202–206 that receive the outputs of buffer RAMs 102–106 over lines 222 and store compensated gray scale levels for all pixels in the array. Compensated gray scale RAMs 202–206 can be implemented by a lookup table which outputs a compensated level stored at a predetermined location when a particular desired gray scale level is received at the input. Decoder PLDs 208–212 receive gray scale bits from compensated gray scale RAMs 202–206 on lines 224 and decode the gray scale bits to produce for each pixel and gray scale level the proper ON excitation pulse sequence during a pixel duration required for uniform light level across the entire array. This data is fed to channel drivers 226–230 and edge emitter arrays (EEAs) 232–236 on lines $dG_1$–$dG_4$, $dB_1$–$dB_4$, and $dR_1$–$dR_4$.

Write address generator controls the writing of data into buffer RAMs 102–106 based on clock 134. Scan address generator 122 controls the reading of data from the buffer RAMs and the reading and writing of data to and from the compensated gray scale RAMs 202–206, as well as providing address inputs to compensation adjustment register 216 and photodetector correction PROM 218. Scan address generator 122 also provides clock 136, load 138 and phase 140 to channel drivers 226–230, as well as signals to common driver 124. Excitation pulse counter 126 counts the number of excitation pulses used for each pixel. The apparatus also includes photodetector 24 for detecting the light output from the edge emitters.

The interface 200 includes compensation logic 214 for controlling and sequencing the in-place recalibration, which is described in more detail in the flow diagram of FIG. 13. Compensation logic 214 is operable to disable buffer RAMs 102–106 and transmit predetermined gray scale codes to compensated gray scale RAMs 202–206 in order to test and adjust the compensation levels stored therein. Compensation logic 214 may be implemented by a sequencer, including commercially available 74HC74 latches and similar chips, programmable logic devices (PLDs), or a microcomputer. Other constructions of compensation logic 214 may also be used. Photodetector correction PROM 218 stores, for each pixel in the array, a predetermined level corrected for the optical collection efficiency of the photodetector. If uniform photodetector response over the entire array exists, then photodetector correction PROM 218 can be eliminated from the interface 200. Comparator 220 compares the light detected from a pixel or group of pixels by photodetector 24 to the corresponding predetermined level stored in photodetector correction PROM 218, and generates an error signal based on the difference in levels. Compensation adjustment register 216 is also provided for adjusting the gray scale levels stored in compensated gray scale RAMs 202–204 in accordance with the error signal from comparator 220. Compensation adjustment register 216 is connected to compensation logic 214, and can instruct compensation logic 214 to retransmit the gray scale code to verify that the newly stored compensation values are correct. Compensation logic 214, compensation adjustment register 216, photodetector correction PROM 218 and comparator 220 can be implemented using a computer and associated memory.

Figure 18:
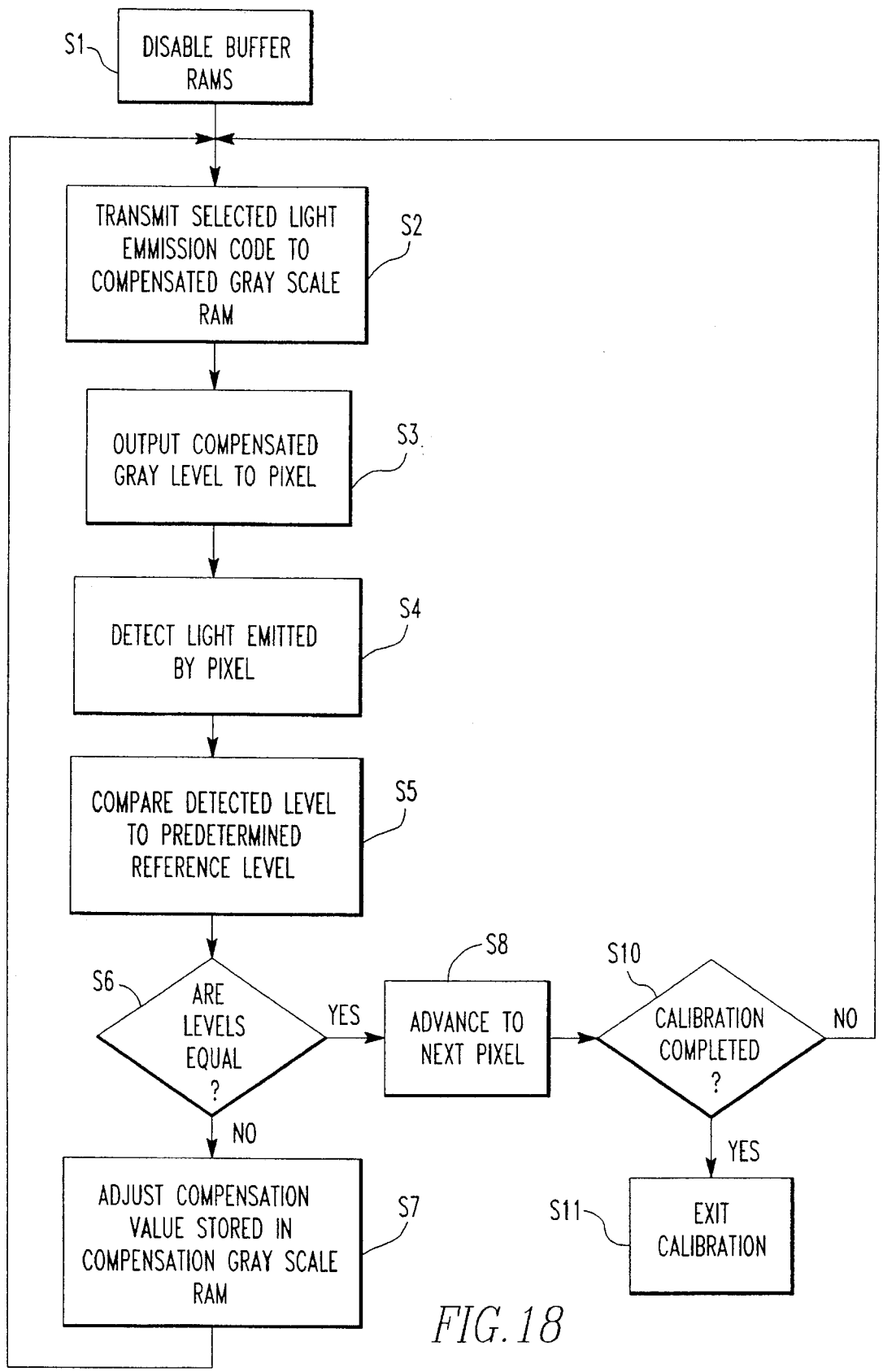
FIG. 18 is a flow chart illustrating the periodic "in place" recalibration method performed using the apparatus of FIG. 17.

FIG. 18 is a flow chart illustrating the periodic "in place" recalibration method in accordance with the preferred embodiment of the invention and using the apparatus shown in FIG. 17. The calibration is controlled and sequenced by compensator logic 214 in FIG. 17. First, the compensator logic 214 disables buffer RAMs 102–106 (step S1). Next, compensation logic 214 transmits a selected light emission code for one pixel or a group of pixels in synchronism with the scan address counter 122 to the address inputs of one of compensated gray scale RAMs 202–206 (step S2). In the address sequence for all other pixels in the array, an OFF code is provided. The compensated gray scale RAM corrects the selected light emission code received at the input according to a stored compensation value, and outputs this compensated level to the specified pixel or group of pixels (step S3) via a corresponding decoder PLD 208–212, channel driver 226–230, and edge emitter array 233–236. In the embodiment shown in FIG. 17, there is a 2 bit gray scale resolution at the input of compensated gray scale RAMs 202–206 and a 3 bit resolution at the output of the compensated gray scale RAMs.

The light level emitted by the selected pixel or pixel group is detected by photodetector 24 (step S4). The light level detected by photodetector 24 is then compared in comparator 220 to a predetermined reference level (stored in photodetector correction PROM 218) corrected for the optical collection efficiency of the photodetector from the selected pixel position in the array (steps S5 and S6). If the detected level does not equal the predetermined reference level (step S6), comparator 220 generates an error signal 238 based on the difference in levels between the signals from the photodetector and from the photodetector correction PROM. The 3 bit gray scale data for the selected pixel or group stored in compensated gray scale RAMs 202–206 is captured by compensation adjustment register 216, adjusted by compensation logic 214 in accordance with the error signal from the comparator, and stored back in the proper location in compensated gray scale RAMs 202–206 (step S7). In order to verify that the adjusted compensation value is correct, the method then returns to step S2, where the compensation logic 214 transmits the same light emission code to the compensated gray scale RAM, in order to determine whether the new light level emitted by the selected pixel equals the predetermined reference level stored in photodetector correction PROM 218.

If comparator 220 indicates that the emitted light level equals the predetermined reference level (step S6), compensation logic advances to the next pixel in order to recalibrate its stored compensation value (step S8). Compensation logic 214 then determines whether calibration has been performed for all pixels (step S10), for example by checking whether compensated gray scale levels are stored in the RAMs for all pixels in the array as well as all gray scale levels (three in this case). If compensation has been completed, the system exits the calibration mode (step S11). Otherwise, the system returns to step S2 and repeats the compensation sequence for the next pixel or group of pixels.

It will be apparent to those skilled in the art that various modifications and variations can be made in the full color TFEL edge emitter of the present invention without departing from the spirit or scope of the invention. Thus, it is intended that the present invention cover the modifications and variations of this invention provided they come within the scope of the appended claims and their equivalents.

What is claimed is:

1. A color photographic printing apparatus using thin film electroluminescent (TFEL) devices comprising:

means for supplying photographic media for the photographic printing apparatus;

a multi-color TFEL edge emitter structure for emitting light of a plurality of different colors onto the photographic media supplied by the supplying means, said multi-color TFEL edge emitter structure including a plurality of light emitting pixels;

an electronic interface for receiving image data and converting the image data into signals for driving the multi-color TFEL edge emitter structure;

a photodetector for sensing light emitted from the multi-color TFEL edge emitter structure and having an output connected to the electronic interface; and means for supplying an interlaced sequence of ON and OFF excitation pulses to each pixel of the TFEL edge emitter structure to create a pixel of print on the photographic media.

2. The color photographic printing apparatus of claim 1, further comprising:

means for varying the interlaced sequence of ON and OFF pulses for each pixel in order to vary respective gray scale of the pixel of print created.

3. The color photographic printing apparatus of claim 2, further comprising:

means for varying a time difference between each excitation pulse and a duration of each excitation pulse in the interlaced sequence of pulses for each pixel.

4. The color photographic printing apparatus of claim 2, wherein the sequence of ON and OFF pulses for each pixel always includes at least one missing pulse.

5. The apparatus of claim 1, wherein the multi-color TFEL edge emitter structure includes a plurality of TFEL edge emitter structures.

6. The apparatus of claim 5, wherein said plurality of TFEL edge emitter structures are fabricated on separate substrates.

7. The apparatus of claim 6, wherein a plurality of lenses are provided separate from the edge emitter structures and focus the light emitted from the edge emitter structures on a single line of the photographic media.

8. The apparatus of claim 5, wherein the plurality of TFEL edge emitter structures are fabricated on a single substrate and are displaced from each other in a direction of scanning of said photographic media.

9. The apparatus of claim 8, wherein minimal spacing is provided between the edge emitter structures and a platen adjacent the photographic media to permit contact printing on the photographic media.

10. The apparatus of claim 1, wherein the electronic interface comprises initial compensation means for permitting compensation for initial nonuniformity in light levels of pixels in the multi-color TFEL edge emitter structure after manufacture.

11. The apparatus of claim 10, further comprising:

recalibration means for periodic correction of nonuniformity in light levels of pixels in the TFEL edge emitter structure.

12. The apparatus of claim 1 further, comprising:

a plurality of TFEL edge emitter drivers, connected between the electronic interface and the multi-color TFEL edge emitter structure, for driving the multi-color TFEL edge emitter structure.

13. The apparatus of claim 12, wherein the electronic interface further comprises:

a plurality of buffer memories, each corresponding to one of the plurality of TFEL edge emitter drivers and having an input for receiving serial data;

a plurality of decoders, each corresponding to one of the plurality of TFEL edge emitter drivers and one of the buffer memories, for decoding data streams from a corresponding buffer memory into a smaller number of data streams to be output to a corresponding TFEL edge emitter driver.

14. An electronic interface for a color photographic printing apparatus using thin film electroluminescent (TFEL) devices comprising:

a plurality of TFEL edge emitter heads, each operates to emit light of a different color and each including an array of pixels;

a plurality of buffer memories, each corresponding to one of the plurality of TFEL edge emitter heads and having an input for receiving serial data;

a plurality of decoders, each corresponding to one of the plurality of TFEL edge emitter heads and one of the buffer memories, for decoding data streams from a corresponding buffer memories into a smaller number of data streams to be output to a corresponding TFEL edge emitter head.

15. The electronic interface of claim 14, wherein each of the buffer memories comprises a plurality of individual memory portions, each storing data to be directed to a corresponding portion of the array of pixels for its respective edge emitter head.

16. The electronic interface of claim 15, wherein each of the decoders comprises a plurality of PROM sections that receive data from a corresponding individual memory portion of one of the buffer memories and provide serial data to a corresponding portion of the array of pixels for its respective edge emitter head.

17. The electronic interface of claim 16, further comprising:

means for controlling the writing of serial data into the buffer memories;

means for reading data out of the buffer memories and generating address inputs for the plurality of decoders;

means for providing excitation pulses on a plurality of busses connected to pixels within each TFEL edge emitter head for energizing the pixels;

means for counting the excitation pulses to identify the excitation pulse within a pixel in the process direction.

18. The electronic interface of claim 14, wherein the plurality of TFEL edge emitter heads include a green edge emitter head, a blue edge emitter head, and a red edge emitter head.

19. The electronic interface of claim 14, wherein a gray scale level for each pixel is defined by more than one serial data bit per pixel.

20. The electronic interface of claim 16, wherein the light energy of different pixels receiving a given number of excitation pulses is compensated for by corrections to the number of ON excitation pulses for pixels in the plurality of PROM sections.

21. The electronic interface of claim 14, further comprising:

means for generating a clock signal for controlling writing of the input serial data into the plurality of buffer memories;

a first first-in-first-out memory, coupled to the input of a first one of the plurality of buffer memories, for delaying the input serial data to be fed to the first one of the plurality of buffer memories.

22. The electronic interface of claim 21, further comprising a second first-in-first-out memory, coupled to the input of a second one of the buffer memories, for delaying the input serial data to be fed to the second buffer memory by an amount different from the delay applied by the first first-in-first-out memory.

23. The electronic interface of claim 14, further comprising a photodector for receiving light levels of light emitting pixels of the TFEL edge emitter heads;

a plurality of gray scale compensation RAMs for storing gray scale levels for all pixels in the array;

means for periodically recalibrating the gray scale levels stored in the gray scale compensation RAMs based on the light levels received by the photodetector.

24. An electrode interface for a photographic printing apparatus using an array of pixels formed from thin film electroluminescent (TFEL) devices comprising:

a memory for storing gray scale levels for all pixels in the array;

a photodetector for detecting light output from a specific pixel in the array of pixels being recalibrated;

a comparator for comparing the detected light output from the pixel that is recalibrated to a predetermined reference level;

means for adjusting each of the gray scale level stored in the memory corresponding to the pixel recalibrated in accordance with the output from the comparator;

means for disabling the at least one buffer memory; and means for providing a selected light emission code for the specific pixel recalibrated from the memory.

25. The electronic interface of claim 24, wherein the memory is a RAM.

26. The electronic interface of claim 24, wherein said predetermined reference level is stored in a PROM.

27. The electronic interface of claim 24, further comprising at least one decoder, coupled to the output of the memory, for decoding gray scale data from the memory into serial data for each pixel of the TFEL edge emitter array.

28. The electronic interface of claim 27, further comprising a plurality of TFEL edge emitter heads, coupled to outputs of the at least one decoder, each operative for emitting light of a different color.

29. The electronic interface of claim 24, further comprising at least one buffer memory for receiving and storing serial data for the pixels in the array, the at least one buffer memory having an output coupled to the memory for storing gray scale levels for pixels in the array.

30. An electronic interface a photographic printing apparatus using an array of pixels formed from thin film electroluminescent (TFEL) devices comprising:

a memory for storing gray scale levels for a plurality of groups of pixels in the array;

a photodetector for detecting light output from one of the groups of pixels in the array;

a comparator for comparing the light output detected from the photodetector to a predetermined reference level;

means for adjusting the gray scale level for the detected group of pixels stored in the memory in accordance with the output from the comparator.

31. A method for compensating a photographic printing system using an array of pixels formed from thin film electroluminescent (TFEL) devices, said method for compensating for variations in light output of different pixels of at various gray scale levels, comprising the steps of:

storing gray scale levels for all pixels in the array;

detecting light output from a specific pixel in the array;

comparing the light output detected from the detecting means to a predetermined reference level;

adjusting the gray scale level for the detected pixel stored in the storing means in accordance with the output from the comparing means.

32. A method for compensating a photographic printing system using an array of pixels formed from thin film electroluminescent (TFEL) devices, said method for compensating for variations in light output of different pixels of at various gray scale levels, comprising the steps of:

storing gray scale levels for a plurality of groups of pixels in the array;

detecting light output from one of the groups of pixels in the array;

comparing the light output detected to a predetermined reference level;

adjusting the gray scale level for the detected group of pixels stored in accordance with outputs of the comparing.

* * * * *